US012596993B2

(12) United States Patent
Wang

(10) Patent No.: US 12,596,993 B2
(45) Date of Patent: Apr. 7, 2026

(54) METHODS, APPARATUSES AND COMPUTER PROGRAM PRODUCTS FOR MANAGING FEATURE PRELOAD DATA OBJECT PROCESSING OPERATIONS IN A CARD-BASED COLLABORATIVE WORKFLOW MANAGEMENT SYSTEM

(71) Applicants: ATLASSIAN PTY LTD., Sydney (AU); ATLASSIAN US, INC., San Francisco, CA (US)

(72) Inventor: Raymond Wang, San Francisco, CA (US)

(73) Assignees: ATLASSIAN PTY, LTD., Sydney (AU); ATLASSIAN US, INC., San Francisco, CA (US)

( * ) Notice: Subject to any disclaimer, the term of this patent is extended or adjusted under 35 U.S.C. 154(b) by 215 days.

(21) Appl. No.: 17/656,715

(22) Filed: Mar. 28, 2022

(65) Prior Publication Data

US 2023/0306367 A1 Sep. 28, 2023

(51) Int. Cl.
| | |
|---|---|
| *G06Q 10/10* | (2023.01) |
| *G06F 11/34* | (2006.01) |
| *G06F 18/214* | (2023.01) |
| *G06N 20/00* | (2019.01) |

(52) U.S. Cl.
CPC ....... *G06Q 10/103* (2013.01); *G06F 11/3438* (2013.01); *G06F 18/214* (2023.01); *G06N 20/00* (2019.01)

(58) Field of Classification Search
CPC . G06Q 10/103; G06F 11/3438; G06F 18/214; G06F 18/213; G06N 20/00
See application file for complete search history.

(56) References Cited

U.S. PATENT DOCUMENTS

| | | | | |
|---|---|---|---|---|
| 9,654,598 | B1 * | 5/2017 | Crawford | H04W 4/023 |
| 10,402,460 | B1 * | 9/2019 | Jesensky | G06F 3/0488 |
| 2003/0202645 | A1 * | 10/2003 | Naik | H04L 41/0806 379/201.1 |
| 2009/0300511 | A1 * | 12/2009 | Behar | G06F 1/162 715/745 |
| 2013/0132228 | A1 * | 5/2013 | Chang | G06Q 30/02 705/26.5 |
| 2013/0198326 | A1 * | 8/2013 | Kessel | H04L 67/1097 709/217 |
| 2013/0238762 | A1 * | 9/2013 | Raleigh | H04L 67/1097 709/219 |

(Continued)

OTHER PUBLICATIONS

Wang, Hanson, Zehui Wang, and Yuanyuan Ma. "Predictive pre-compute with recurrent neural networks." Proceedings of Machine Learning and Systems 2 (2020): 470-480. (Year: 2020).*

*Primary Examiner* — Corey Russ
(74) *Attorney, Agent, or Firm* — Alston & Bird LLP

(57) ABSTRACT

Various embodiments herein described are directed to methods, apparatuses and computer program products configured for managing feature preload data object processing operations in association with a card-based collaborative workflow management system. In some embodiments, a feature processing server may generate a feature preload data object and output the feature preload data object to a client device to enable low latency rendering of one or more feature interface elements to the card-based collaborative workflow management user interface.

31 Claims, 11 Drawing Sheets

(56)        References Cited

U.S. PATENT DOCUMENTS

| | | | |
|---|---|---|---|
| 2014/0372864 A1* | 12/2014 | Zaragoza | G06F 16/9535 |
| | | | 715/234 |
| 2015/0100892 A1* | 4/2015 | Cronin | G06Q 10/0633 |
| | | | 715/747 |
| 2015/0212710 A1* | 7/2015 | Gupta | G06Q 30/0641 |
| | | | 715/765 |
| 2016/0231881 A1* | 8/2016 | Sirpal | G06F 3/04845 |
| 2017/0090879 A1* | 3/2017 | Veltri | G06Q 10/063 |
| 2017/0140006 A1* | 5/2017 | Yang | G06F 16/2228 |
| 2018/0081984 A1* | 3/2018 | Liang | G06F 16/9574 |
| 2018/0097905 A1* | 4/2018 | Todasco | H04L 67/02 |
| 2019/0370307 A1* | 12/2019 | Krutzler | G06F 3/0488 |
| 2020/0092695 A1* | 3/2020 | Vigeant | H04N 7/15 |
| 2021/0299577 A1* | 9/2021 | Kerr | A63F 13/79 |
| 2021/0326017 A1* | 10/2021 | Sultan | G06F 40/279 |
| 2021/0329088 A1* | 10/2021 | Yellin | G06F 9/44505 |
| 2021/0329090 A1* | 10/2021 | Yellin | G06F 9/44505 |
| 2022/0004413 A1* | 1/2022 | Vetter | G06F 9/452 |
| 2022/0188128 A1* | 6/2022 | Abadzhimarinov | |
| | | | G06F 9/44521 |
| 2022/0222418 A1* | 7/2022 | Ziraknejad | G06Q 10/10 |
| 2022/0261258 A1* | 8/2022 | Peled | G06F 9/451 |
| 2024/0124403 A1* | 4/2024 | Sherwin | C07D 231/48 |

* cited by examiner

400

| Feature Interface Element 401 | Preload Status 403 | Feature Interface Element Size 405 | Loading Latency Period 407 |
|---|---|---|---|
| 310A | Preload Feature Interface Element | 2080 KB | 4 Seconds |
| 301 | Preload Feature Interface Element | 1000 KB | 3 Seconds |
| 310B | Preload Feature Interface Element | 500 KB | 1 Second |
| 310D | Preload Feature Interface Element | 500 KB | 1 Second |
| 302 | Non-Preload Feature Interface Element | 200 KB | 200 Milliseconds |
| 310C | Non-Preload Feature Interface Element | 200 KB | 200 Milliseconds |

GENERATE CARD-BASED COLLABORATIVE
WORKFLOW MANAGEMENT USER INTERFACE
SESSION LAUNCH INDICATION
502

RETRIEVE PRELOAD DATA OBJECT
504

PRELOAD AT LEAST ONE FEATURE INTERFACE
ELEMENT USING THE FEATURE PRELOAD DATA
OBJECT
506

PRELOAD AT LEAST ONE SECONDARY FEATURE
INTERFACE ELEMENT IN RESPONSE TO USER
INTERACTION
508

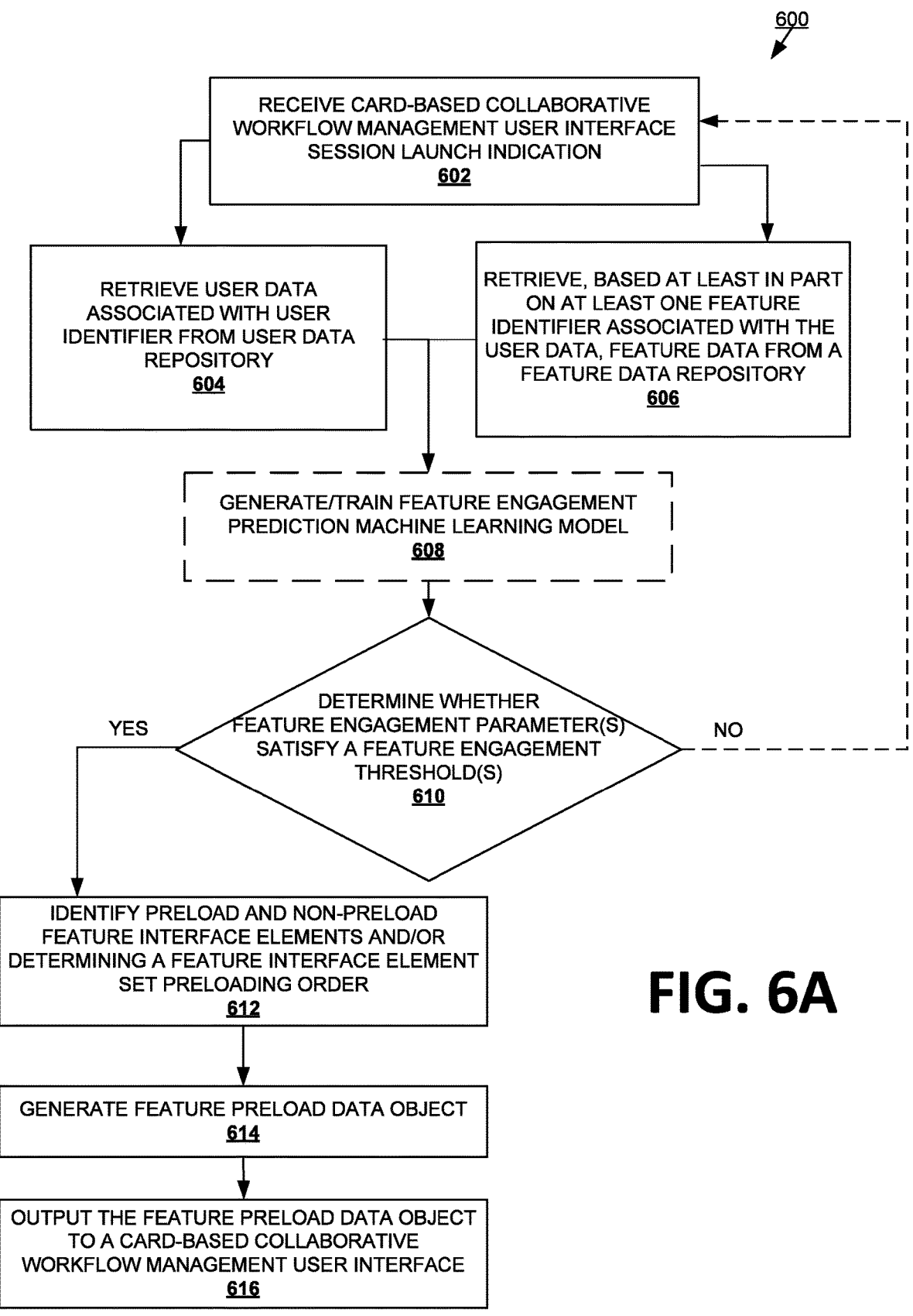

600

RECEIVE CARD-BASED COLLABORATIVE WORKFLOW MANAGEMENT USER INTERFACE SESSION LAUNCH INDICATION
602

RETRIEVE USER DATA ASSOCIATED WITH USER IDENTIFIER FROM USER DATA REPOSITORY
604

RETRIEVE, BASED AT LEAST IN PART ON AT LEAST ONE FEATURE IDENTIFIER ASSOCIATED WITH THE USER DATA, FEATURE DATA FROM A FEATURE DATA REPOSITORY
606

GENERATE/TRAIN FEATURE ENGAGEMENT PREDICTION MACHINE LEARNING MODEL
608

DETERMINE WHETHER FEATURE ENGAGEMENT PARAMETER(S) SATISFY A FEATURE ENGAGEMENT THRESHOLD(S)
610

YES

NO

IDENTIFY PRELOAD AND NON-PRELOAD FEATURE INTERFACE ELEMENTS AND/OR DETERMINING A FEATURE INTERFACE ELEMENT SET PRELOADING ORDER
612

GENERATE FEATURE PRELOAD DATA OBJECT
614

OUTPUT THE FEATURE PRELOAD DATA OBJECT TO A CARD-BASED COLLABORATIVE WORKFLOW MANAGEMENT USER INTERFACE
616

FIG. 6A

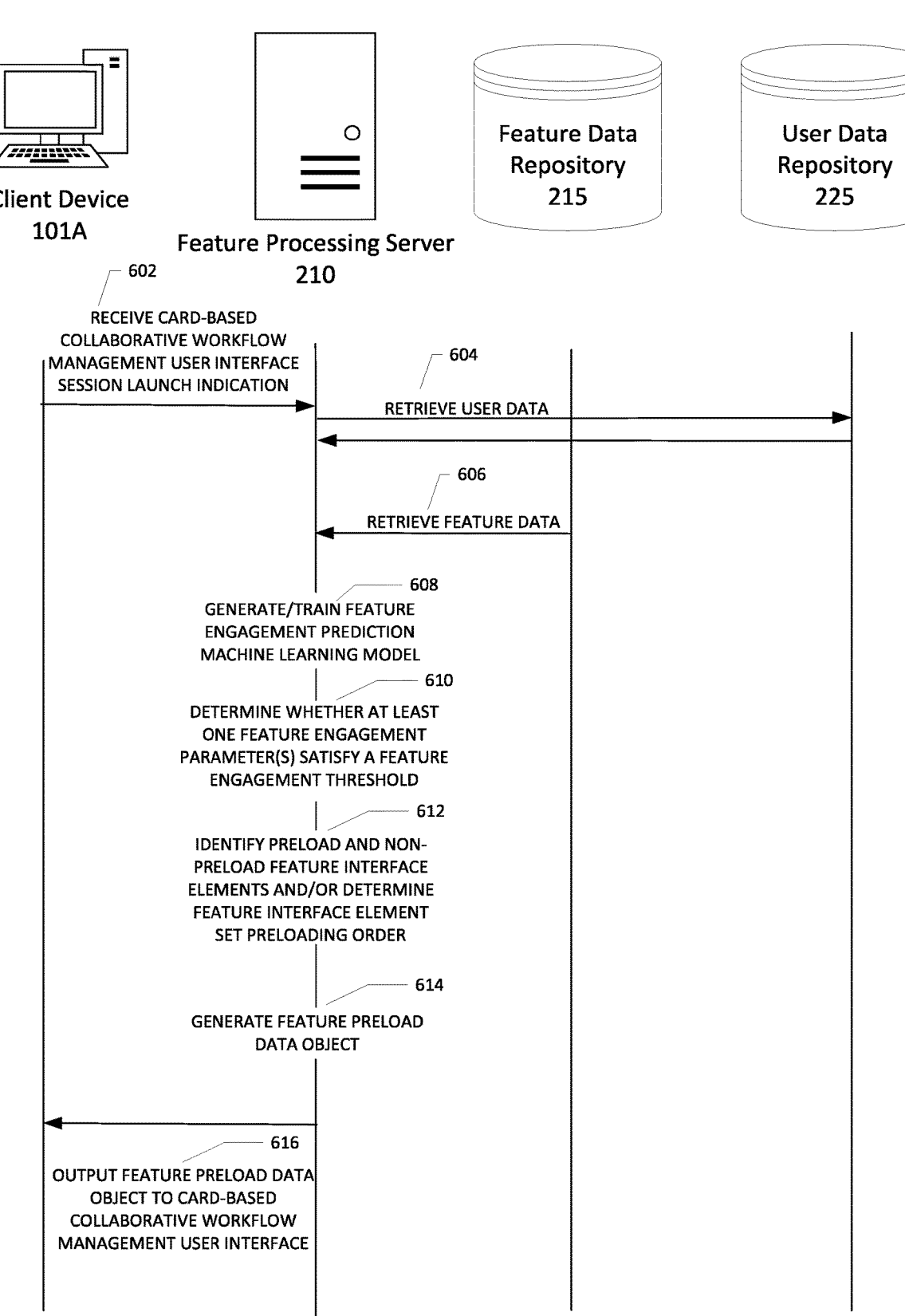

Client Device 101A

Feature Processing Server 210

Feature Data Repository 215

User Data Repository 225

602
RECEIVE CARD-BASED
COLLABORATIVE WORKFLOW
MANAGEMENT USER INTERFACE
SESSION LAUNCH INDICATION

604
RETRIEVE USER DATA

606
RETRIEVE FEATURE DATA

608
GENERATE/TRAIN FEATURE
ENGAGEMENT PREDICTION
MACHINE LEARNING MODEL

610
DETERMINE WHETHER AT LEAST
ONE FEATURE ENGAGEMENT
PARAMETER(S) SATISFY A FEATURE
ENGAGEMENT THRESHOLD

612
IDENTIFY PRELOAD AND NON-
PRELOAD FEATURE INTERFACE
ELEMENTS AND/OR DETERMINE
FEATURE INTERFACE ELEMENT
SET PRELOADING ORDER

614
GENERATE FEATURE PRELOAD
DATA OBJECT

616
OUTPUT FEATURE PRELOAD DATA
OBJECT TO CARD-BASED
COLLABORATIVE WORKFLOW
MANAGEMENT USER INTERFACE

FIG. 6B

METHODS, APPARATUSES AND COMPUTER PROGRAM PRODUCTS FOR MANAGING FEATURE PRELOAD DATA OBJECT PROCESSING OPERATIONS IN A CARD-BASED COLLABORATIVE WORKFLOW MANAGEMENT SYSTEM

BACKGROUND

Applicant has identified many technical deficiencies and problems associated with managing software interface features in complex computer systems. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provide methods, apparatus, systems, computing devices, and/or the like for managing feature preload data object processing operations and generating feature interface elements in association with a card-based collaborative workflow management system.

In accordance with one exemplary embodiment of the present disclosure, an apparatus for managing a card-based collaborative workflow management user interface associated with a card-based collaborative workflow management system is provided. In some embodiments, the apparatus comprises at least one processor and at least one non-transitory memory comprising program code. In some embodiments, the at least one non-transitory memory and the program code are configured to, with the at least one processor, cause the apparatus to at least: In accordance with one exemplary embodiment of the present disclosure, an apparatus is provided. In some embodiments, the apparatus comprises at least one processor and at least one non-transitory memory comprising program code. In some embodiments, the at least one non-transitory memory and the program code are configured to, with the at least one processor, cause the apparatus to at least: identify a user identifier associated with a card-based collaborative workflow management user interface session launch indication; retrieve user data associated with the user identifier from a user data repository; retrieve, based at least in part on at least one feature identifier associated with the user data, feature data from a feature data repository; determine, based at least in part on analysis of the user data and the feature data, whether at least one feature engagement parameter associated with the at least one feature identifier satisfies at least one feature engagement threshold; in an instance in which the at least one feature engagement parameter satisfies the at least one feature engagement threshold, generate a feature preload data object; and output the feature preload data object to a client device associated with the user identifier to enable low latency rendering of one or more feature interface elements to a card-based collaborative workflow management user interface.

In some embodiments, the feature preload data object comprises computer-executable instructions for preloading at least one of a plurality of feature interface elements in the card-based collaborative workflow management user interface.

In some embodiments, each of the plurality of feature interface elements is associated with a feature preload data object validity period.

In some embodiments, determining whether the at least one feature engagement parameter satisfies the at least one feature engagement threshold is determined using a feature engagement prediction machine learning model.

In some embodiments, the feature engagement prediction machine learning model is trained based at least in part on historical feature data associated with the at least one feature identifier and user activity data logs.

In some embodiments, the user data comprises historical user interaction data with the card-based collaborative workflow management user interface.

In some embodiments, the at least one feature engagement threshold comprises a configurable parameter defining at least one of a user interaction time period, an interaction count, a feature interface element size, and a loading latency period associated with at least one feature interface element.

In some embodiments, the computer-coded instructions are configured to, in execution with the at least one processor, cause the apparatus to: determine, based at least on the user data and the feature data, feature interface element set preloading order; and generate the feature preload data object based at least in part on the feature interface element set preloading order.

In some embodiments, the feature preload data object is configured to: trigger preloading of the plurality of feature interface elements in accordance with the feature interface element set preloading order.

In some embodiments, the feature preload data object is configured to: trigger preloading of at least one secondary feature interface element in response to a user interaction with at least one of the plurality of feature interface elements.

In accordance with various embodiments of the present disclosure, a computer-implemented method for managing a card-based collaborative workflow management user interface associated with a card-based collaborative workflow management system is provided. The computer-implemented method may comprise: identifying, by one or more processors, a user identifier associated with a card-based collaborative workflow management user interface session launch indication; retrieving, by the one or more processors, user data associated with the user identifier from a user data repository; retrieving, by the one or more processors and based at least in part on at least one feature identifier associated with the user data, feature data from a feature data repository; determining, by the one or more processors and based at least in part on analysis of the user data and the feature data, whether at least one feature engagement parameter associated with the at least one feature identifier satisfies at least one feature engagement threshold; in an instance in which the at least one feature engagement parameter satisfies the at least one feature engagement threshold, generating, by the one or more processors, a feature preload data object; and outputting, by the one or more processors, the feature preload data object to a client device associated with the user identifier to enable low latency rendering of one or more feature interface elements to the card-based collaborative workflow management user interface.

In some embodiments, the feature preload data object comprises computer-executable instructions for preloading at least one of a plurality of feature interface elements in the card-based collaborative workflow management user interface.

In some embodiments, each of the plurality of feature interface elements is associated with a feature preload data object validity period.

In some embodiments, determining whether the at least one feature engagement parameter satisfies the at least one feature engagement threshold is determined using a feature engagement prediction machine learning model.

In some embodiments, the feature engagement prediction machine learning model is trained based at least in part on historical feature data associated with the at least one feature identifier and user activity data logs.

In some embodiments, the user data comprises historical user interaction data with the card-based collaborative workflow management user interface.

In some embodiments, the at least one feature engagement threshold comprises a configurable parameter defining at least one of a user interaction time period, an interaction count, a feature interface element size, and a loading latency period associated with at least one feature interface element.

In some embodiments, the computer-implemented method further comprises: determining, by the one or more processors and based at least on the user data and the feature data, feature interface element set preloading order; and generating, by the one or more processors, the feature preload data object based at least in part on the feature interface element set preloading order.

In some embodiments, the feature preload data object is configured to: trigger preloading of the plurality of feature interface elements in accordance with the feature interface element set preloading order.

In some embodiments, the feature preload data object is configured to: trigger preloading of at least one secondary feature interface element in response to a user interaction with at least one of the plurality of feature interface elements.

In accordance with various embodiments of the present disclosure, a computer program product is provided. The computer program product may comprise at least one non-transitory computer-readable storage medium having computer-readable program code portions stored therein, the computer-readable program code portions comprising an executable portion configured to: identify a user identifier associated with a card-based collaborative workflow management user interface session launch indication; retrieve user data associated with the user identifier from a user data repository; retrieve, based at least in part on at least one feature identifier associated with the user data, feature data from a feature data repository; determine, based at least in part on analysis of the user data and the feature data, whether at least one feature engagement parameter associated with the at least one feature identifier satisfies at least one feature engagement threshold; in an instance in which the at least one feature engagement parameter satisfies the at least one feature engagement threshold, generate a feature preload data object; and output the feature preload data object to a client device associated with the user identifier to enable low latency rendering of one or more feature interface elements to the card-based collaborative workflow management user interface.

In some embodiments, the feature preload data object comprises computer-executable instructions for preloading at least one of a plurality of feature interface elements in the card-based collaborative workflow management user interface.

In some embodiments, each of the plurality of feature interface elements is associated with a feature preload data object validity period.

In some embodiments, determining whether the at least one feature engagement parameter satisfies the at least one feature engagement threshold is determined using a feature engagement prediction machine learning model.

In some embodiments, the feature engagement prediction machine learning model is trained based at least in part on historical feature data associated with the at least one feature identifier and user activity data logs.

In some embodiments, the user data comprises historical user interaction data with the card-based collaborative workflow management user interface.

In some embodiments, the at least one feature engagement threshold comprises a configurable parameter defining at least one of a user interaction time period, an interaction count, a feature interface element size, and a loading latency period associated with at least one feature interface element.

In some embodiments, the computer-readable program code portions comprise the executable portion configured to: determine, based at least on the user data and the feature data, feature interface element set preloading order; and generate the feature preload data object based at least in part on the feature interface element set preloading order.

In some embodiments, the feature preload data object is configured to: trigger preloading of the plurality of feature interface elements in accordance with the feature interface element set preloading order.

In some embodiments, the feature preload data object is configured to: trigger preloading of at least one secondary feature interface element in response to a user interaction with at least one of the plurality of feature interface elements.

In accordance with various embodiments of the present disclosure, another apparatus is provided. In some embodiments, the apparatus is configured to manage an enterprise content management system user interface associated with an enterprise content management system. In some embodiments, the apparatus comprises at least one processor and at least one non-transitory memory, the at least one non-transitory memory having computer-coded instructions therein, wherein the computer-coded instructions are configured to, in execution with the at least one processor, cause the apparatus to: identify a user identifier associated with an enterprise content management system management user interface session launch indication; retrieve user data associated with the user identifier from a user data repository; retrieve, based at least in part on at least one feature identifier associated with the user data, feature data from a feature data repository; determine, based at least in part on analysis of the user data and the feature data, whether at least one feature engagement parameter associated with the at least one feature identifier satisfies at least one feature engagement threshold; in an instance in which the at least one feature engagement parameter satisfies the at least one feature engagement threshold, generate a feature preload data object; and output the feature preload data object to a client device associated with the user identifier to enable low latency rendering of one or more feature interface elements to the enterprise content management system user interface.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
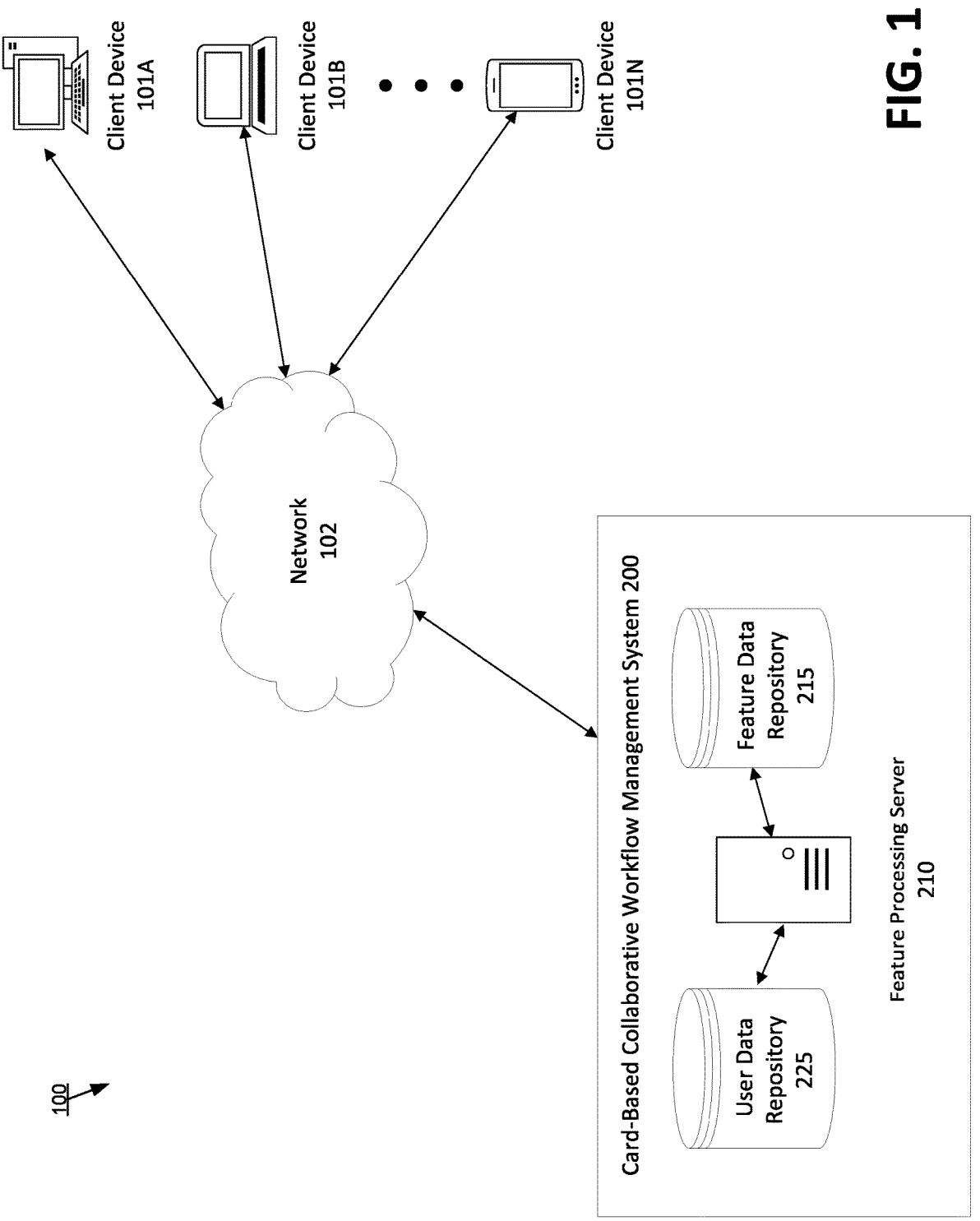
Figure 2:
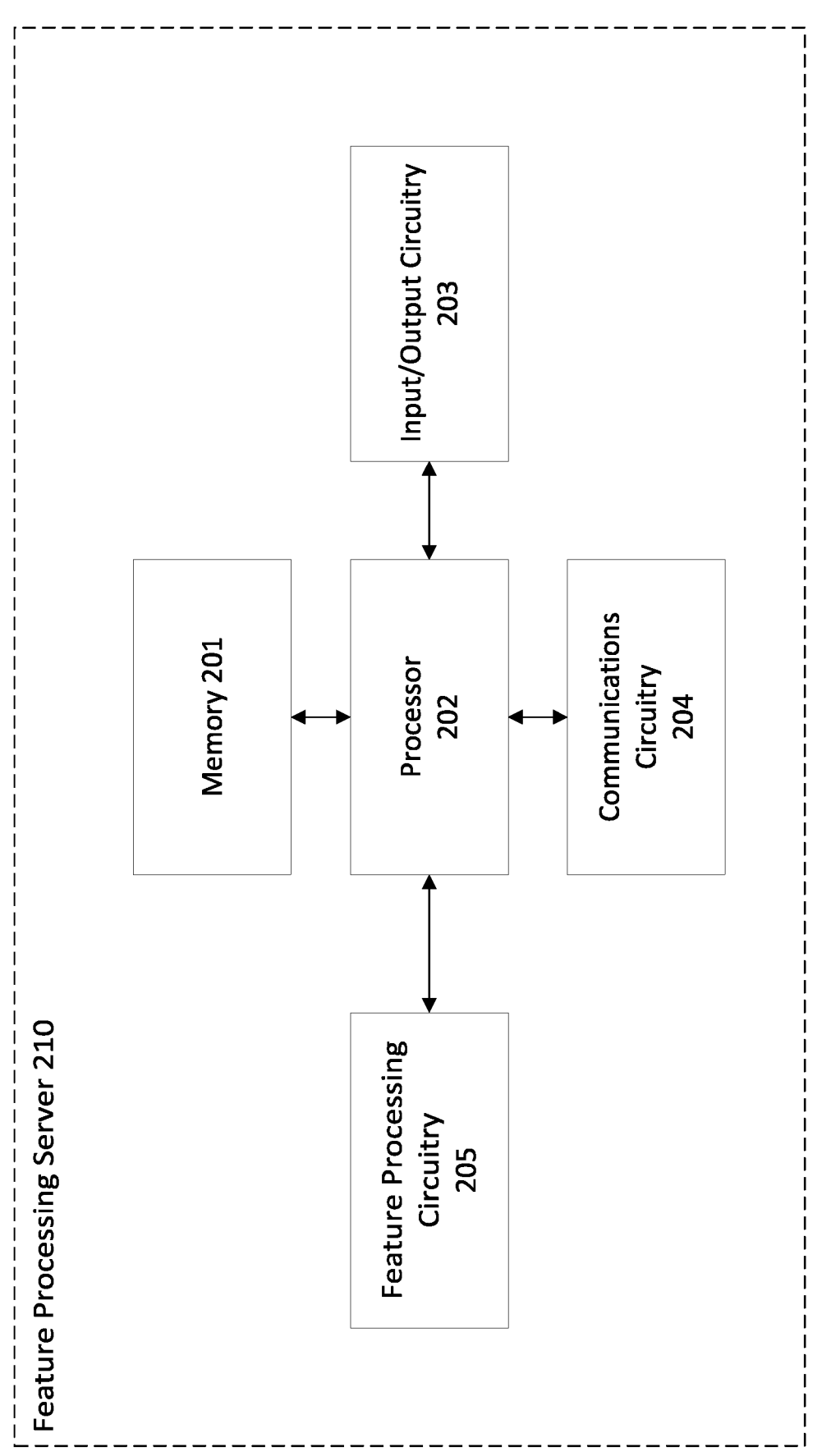
Figure 3A:
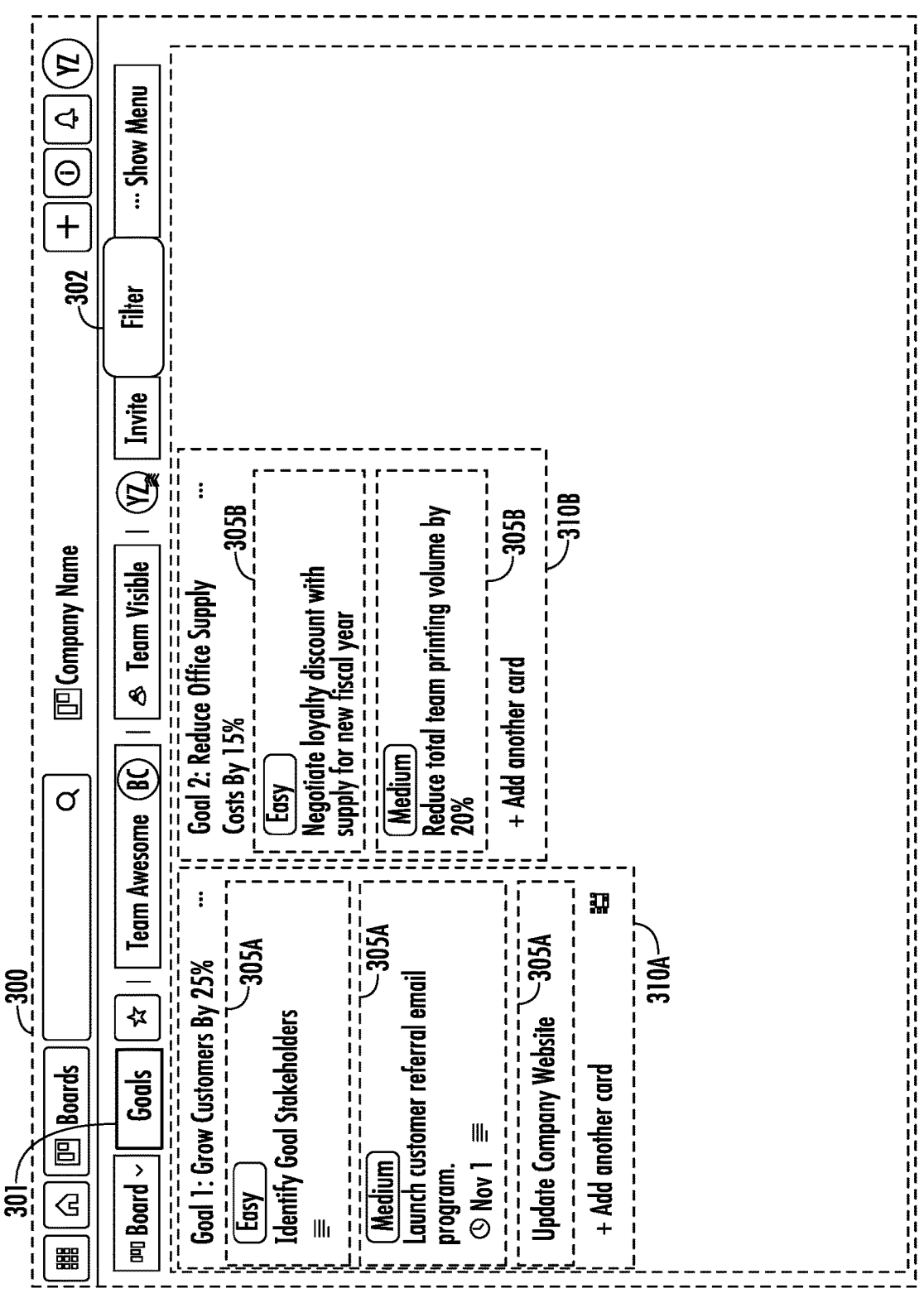
Figure 3B:
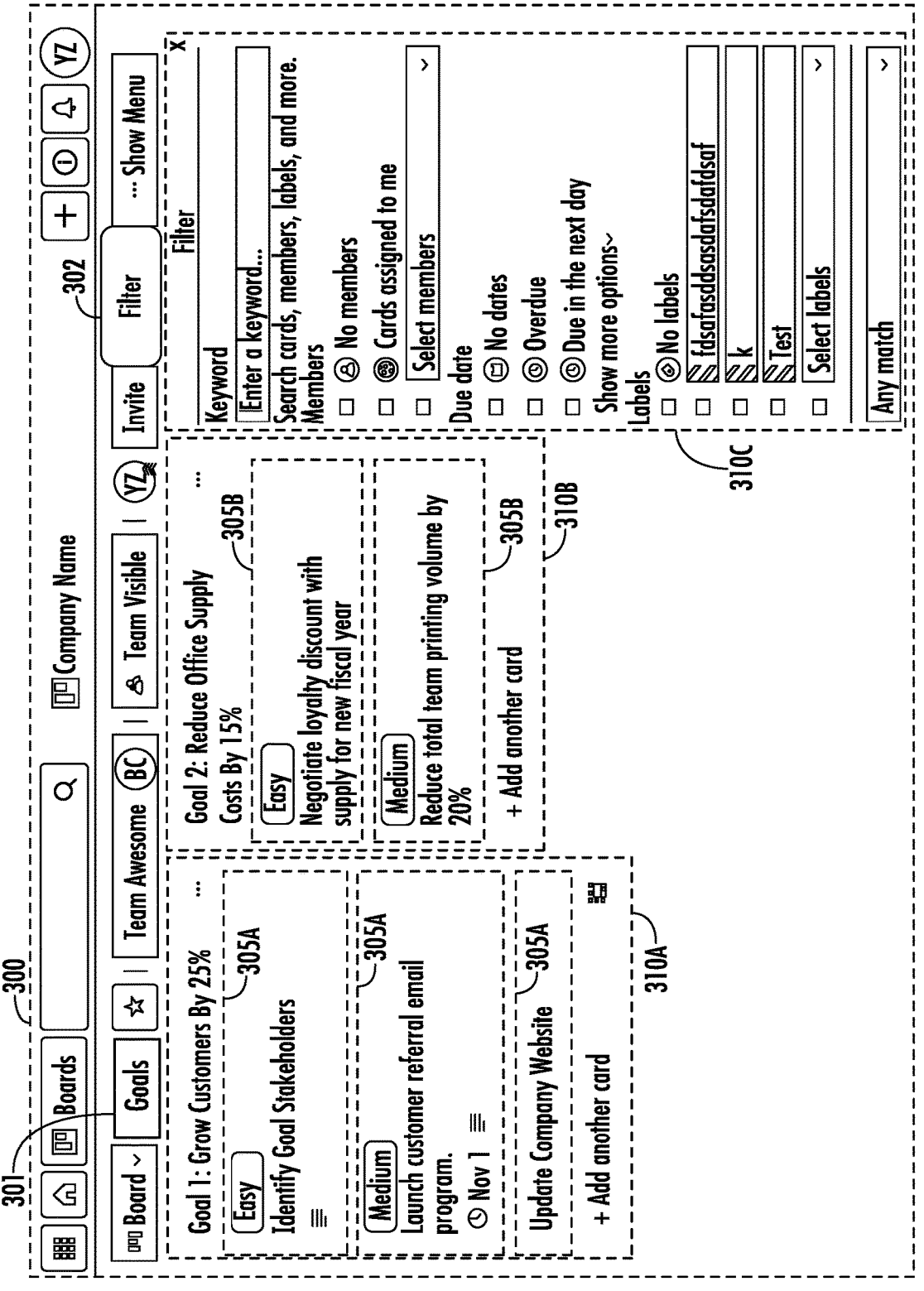
Figure 3C:
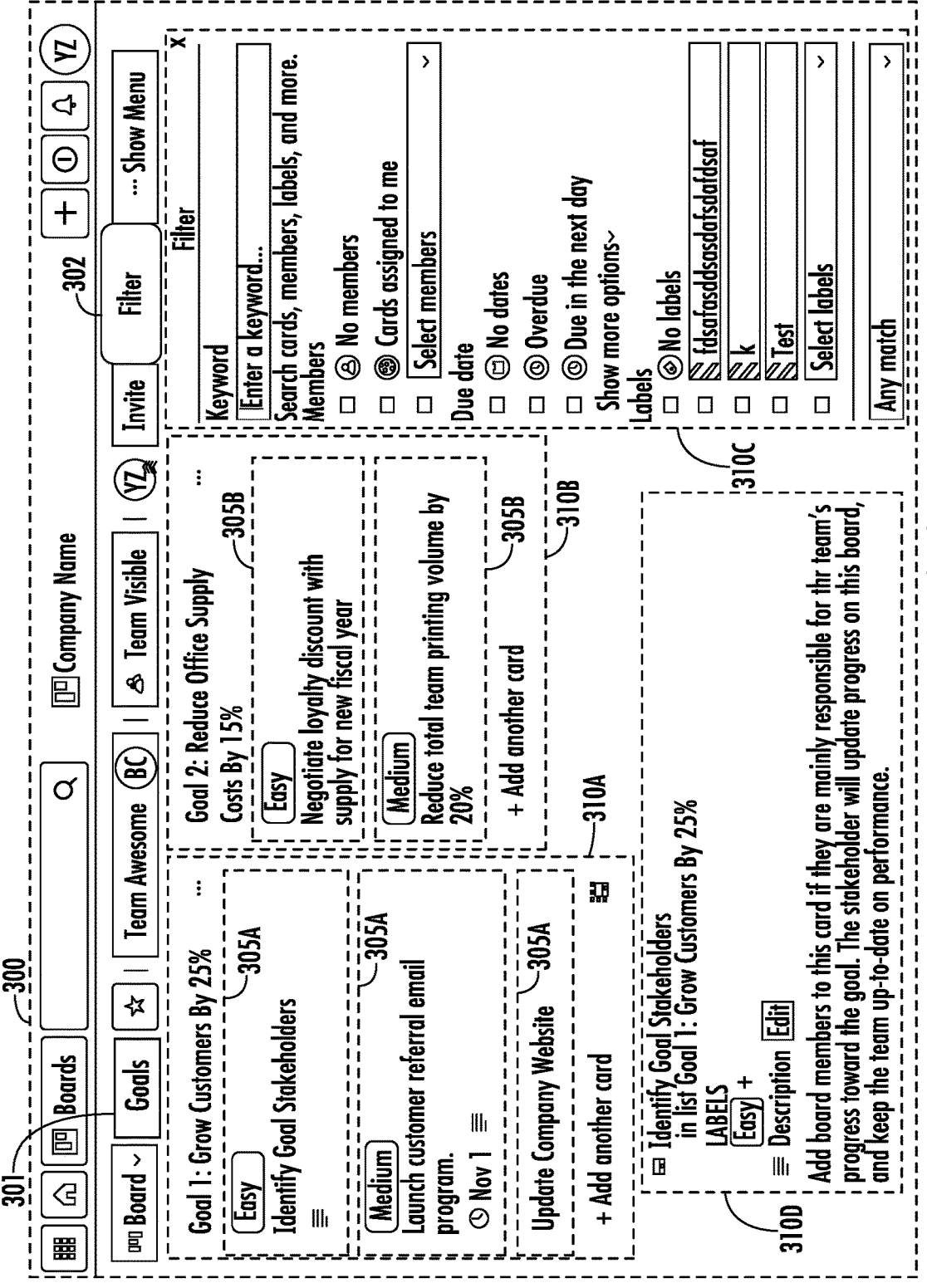
Figure 3D:
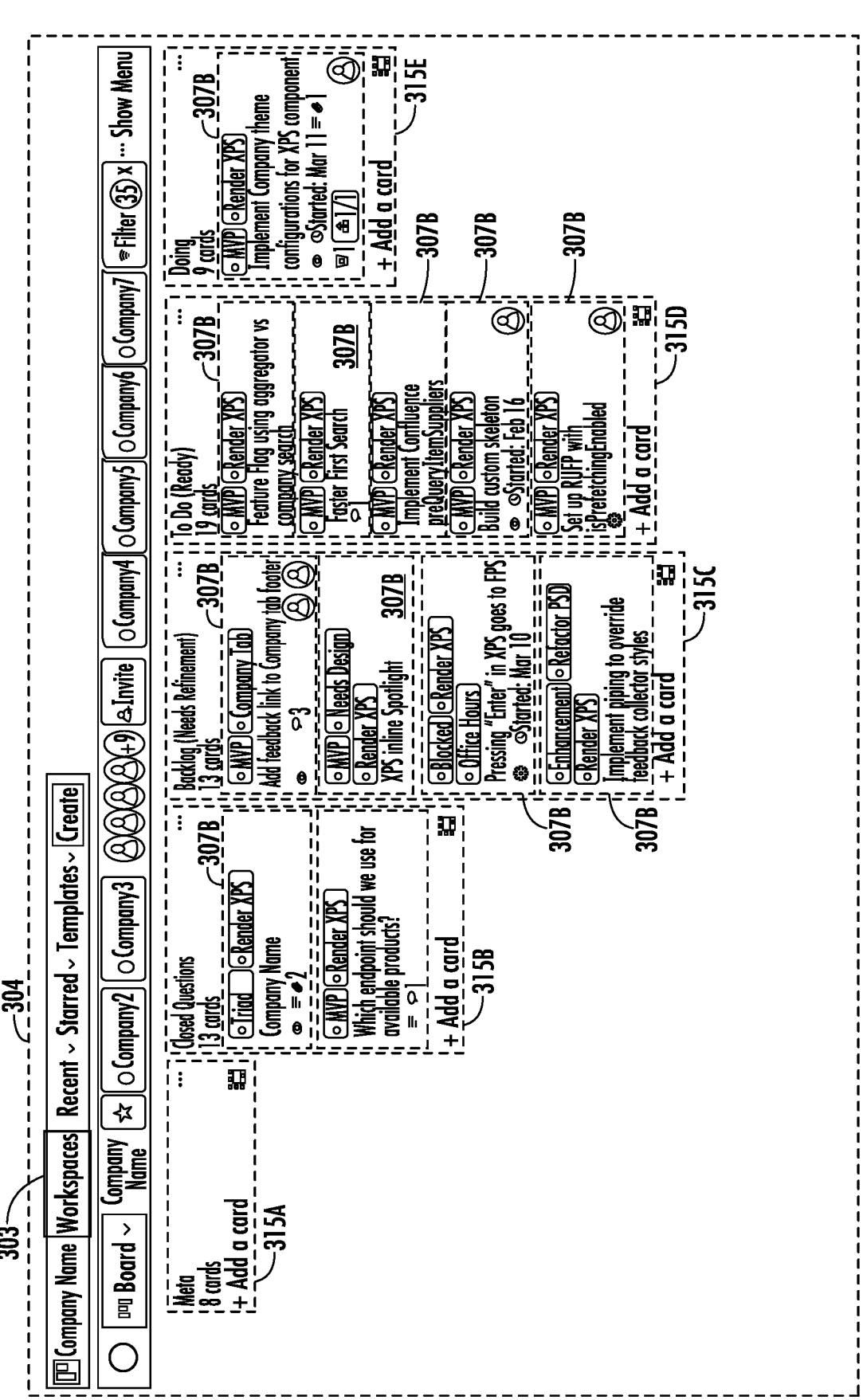
Figure 3E:
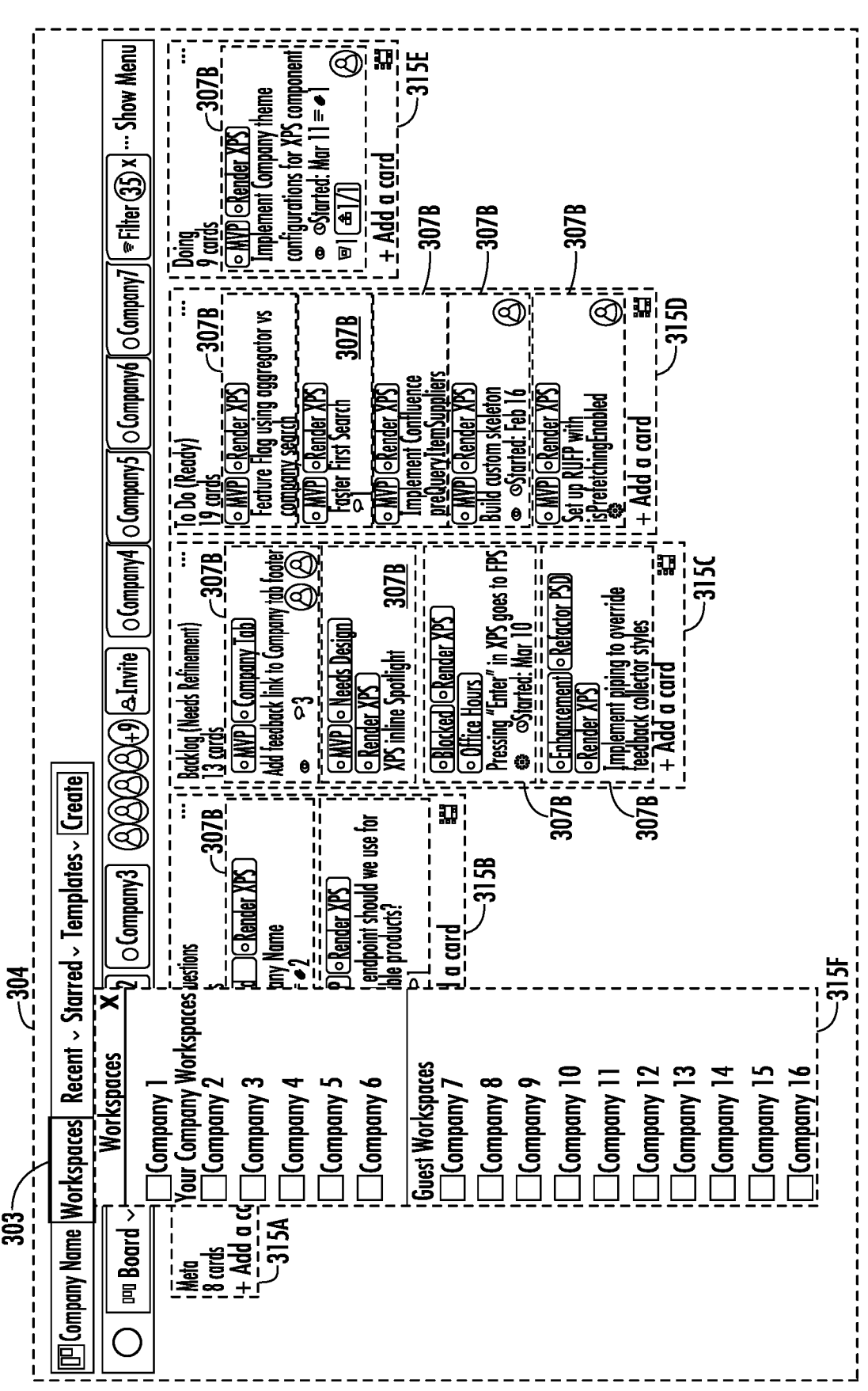
Figure 5:
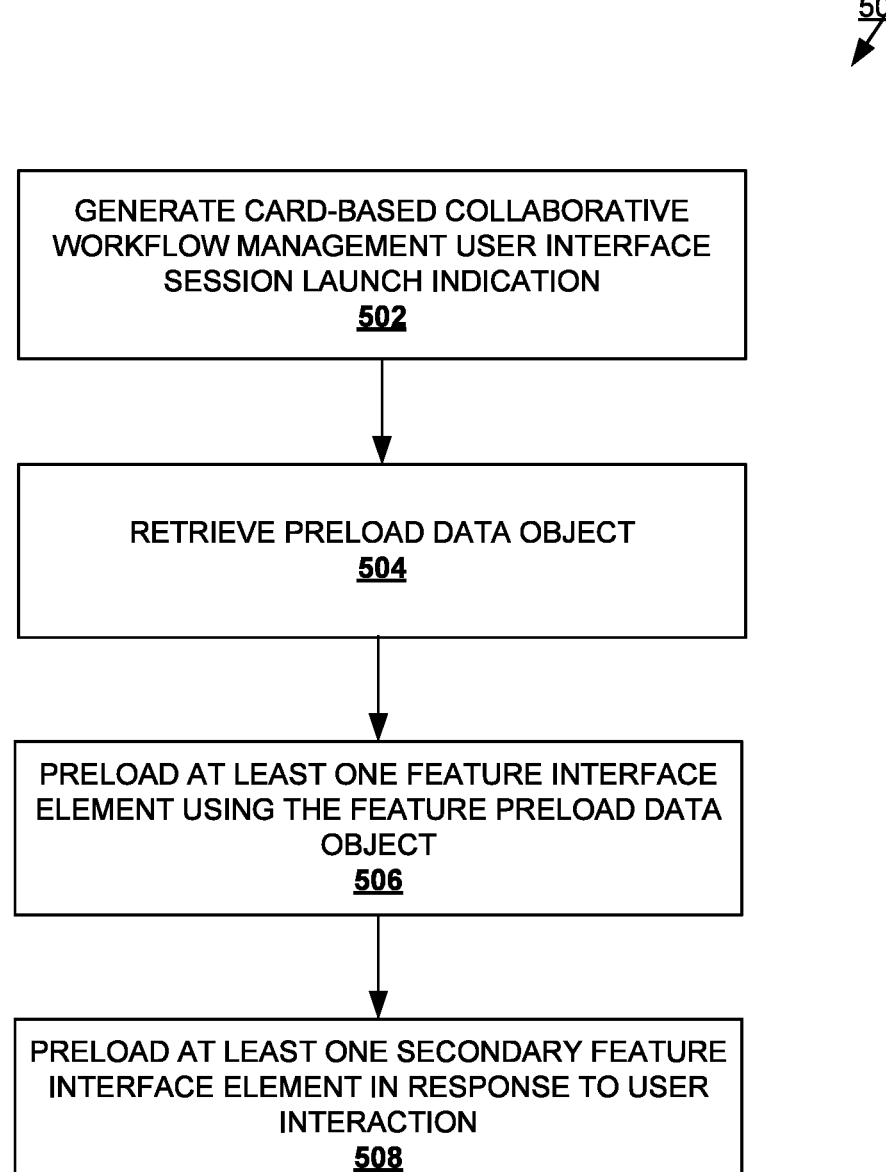

Having thus described some embodiments in general terms, references will now be made to the accompanying drawings, which are not necessarily drawn to scale, and wherein:

FIG. 1 illustrates an example card-based collaborative workflow management system configured to communicate with one or more client devices in accordance with some example embodiments described herein;

FIG. 2 is a schematic block diagram of example circuitry for use in a client device in accordance with some example embodiments described herein;

FIG. 3A illustrates an example card-based collaborative workflow management user interface in accordance with some example embodiments described herein;

FIG. 3B illustrates another example card-based collaborative workflow management user interface in accordance with some example embodiments described herein;

FIG. 3C illustrates yet another example card-based collaborative workflow management user interface in accordance with some example embodiments described herein;

FIG. 3D illustrates yet another example card-based collaborative workflow management user interface in accordance with some example embodiments described herein;

FIG. 3E illustrates yet another example card-based collaborative workflow management user interface in accordance with some example embodiments described herein;

FIG. 4 illustrates an exemplary data structure associated with an example card-based collaborative workflow management user interface in accordance with some example embodiments described herein;

FIG. 5 is a flowchart illustrating example operations for managing a card-based collaborative workflow management user interface in accordance with some example embodiments described herein;

FIG. 6A is another flowchart illustrating example operations for managing feature interface elements in accordance with some example embodiments described herein; and FIG. 6B is a signal diagram of an example data flow in accordance with some example embodiments described herein.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements.

The term "comprising" means "including but not limited to," and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," "in some examples," "for example," and the like generally mean that the particular feature, structure, or characteristic following the phrase may be included in an embodiment of the present disclosure, and may be included in more than one embodiment of the present disclosure (importantly, such phrases do not necessarily refer to the same embodiment).

Overview

Various embodiments of the present disclosure relate generally to managing feature preload data object processing operations and generating feature interface elements associated with a card-based collaborative workflow management system. In various examples, a plurality of client devices may retrieve data simultaneously from a remote computing entity or server in order to generate and render card-based collaborative workflow management user interfaces as part of a card-based collaborative workflow management system. In some examples, large numbers of such data requests at a given instance in time may result in measurable and/or perceptible degradation of computing performance for each of the plurality of client devices. For example, an end user may perceive and experience delays when interacting with feature interface elements of the card-based collaborative workflow management user interface (e.g., certain feature interface elements may render visibly slowly). Accordingly, the inventors have determined it would be desirable and advantageous to be able to effectively manage feature preload data object processing operations in relation to card-based collaborative workflow management system by, for example, facilitating customized low latency rendering of particular feature interface elements for end-users.

Example embodiments of the present disclosure may overcome the above-referenced challenges. From the end-user perspective, feature interface elements and feature processing servers structured in accordance with various embodiments of the present disclosure increase the processing speed and efficiency of card-based collaborative workflow management systems. Advantageously, and in some examples, the feature preload data object processing operations using the methods, apparatus, and computer program products described herein, facilitate selective and dynamic preloading of certain feature interface elements for users in order to improve overall system performance.

In particular, the card-based collaborative workflow management system may comprise card data objects that may represent, for example, tasks associated with a team or group of people. Each of the card data objects may be associated with a list data object, which may represent, for example, a list of tasks associated with the team or group of people. As such, the card-based collaborative workflow management system may allow a group of people to manage various tasks based at least in part on generating one or more card data objects, list data objects, and/or board data objects, and generating card data object renderings, list data object renderings, and/or board data object renderings that are displayed on client devices associated with the group of people. Additional definitions and details of card data object and list data object are described herein.

However, many systems lack capability in supporting differentiated/customized rendering of card-based collaborative workflow management user interfaces based on particular user needs/usage patterns in an efficient fashion that accounts for overall system capacity at any given time. Accordingly, unnecessary computing resource consumption (for example, an increase in processor workload and storage space) and processing latency may occur when examples of the present disclosure are not implemented. For example, when hundreds of requests associated with various card-based collaborative workflow management user interfaces are generated within a short period of time, computing resource consumption and processing latency may increase.

Example embodiments of the present disclosure may overcome the above-referenced technical challenges while providing various technical benefits.

For example, various embodiments of the present disclosure may relate to generating feature preload data objects that can be used to manage client-side feature preload operations. The ability to locally and dynamically customize feature preloading operations for particular users may eliminate the need to provision or segment more storage space in any database models on the server-side, and may reduce computing resource needed for facilitating rendering of user interfaces. Additionally, client-side storage enables tracking user actions without compromising Personally Identifiable Information (PII) as data/information that may contain PII (for example, metadata) are stored locally and may not be transmitted to the server, thereby enhancing the security and privacy of sensitive user information.

Systems structured in accordance with various embodiments of the present disclosure may provide sufficient data integrity and reliability for card data objects, list data objects and board data objects, may reduce computing resource consumption and processing latency, and may provide specific, technical solutions to technical problems faced by many systems, details of which are described hereinafter.

Definitions

As used herein, the term "card-based collaborative workflow management system" refers to a software platform(s) and associated hardware that is configured to support, maintain, and manage a plurality of project(s), task(s), workflow(s), and all associated functionality, including collaboration among users, via card data object(s), list data objects, and/or board data object(s). For example, in some embodiments, a card data object represents one or more tasks associated with a team or group of users. In some embodiments, one or more card data objects are associated with a list data object, which represents a list of tasks associated with the team or group of users. In still further embodiments, one or more card data objects and/or one or more list data objects are associated with a board data object such that the board data object is an organized set of the one or more list data objects and/or the one or more card data objects. For example, in some embodiments, a board data object corresponds to and/or represents a project and each card data object and/or list data object associated with the board data object represents a subset of tasks associated with such project. As such, the card-based collaborative workflow management system is configured to enable a group of users to manage various tasks based at least in part on one or more card data objects, one or more list data objects, and/or one or more board data objects, renderings of which are displayed to card-based collaborative workflow management user interfaces on client devices associated with the users. Example card-based collaborative workflow management systems comprise supporting server(s), repositor(ies), and client device(s), and in some embodiments, are further configured to engage with external resource(s) and external application(s).

The term "card-based collaborative workflow management user interface" refers to a graphical user interface or sub-user interface of a card-based collaborative workflow management system that is configured to enable users to view, access, review, modify, edit, and/or otherwise engage with the card-based collaborative workflow management system. A card-based collaborative workflow management user interface may be rendered to a client device based on data objects (e.g., comprising data and instructions) provided by a card-based collaborative workflow management system (e.g., feature processing server). In some embodiments, such data and instructions are facilitated by a dedicated software application running on the client device. In other embodiments, such data and instructions are provided through a web browser running on the client device. For example, the card-based collaborative workflow management user interface 300 of FIG. 3A is an example of a card-based collaborative workflow management user interface.

The term "card-based collaborative workflow management user interface session launch indication" refers to an electronically generated data object or digital object that is created by or otherwise originates from a computing device associated with a user identifier requesting generation and output of a card-based collaborative workflow management user interface with respect to the particular user. In this regard, a card-based collaborative workflow management user interface session launch indication may cause initiation of a process that may culminate in rendering a card-based collaborative workflow management user interface. In some embodiments, a card-based collaborative workflow management user interface session launch indication is represented via a temporary code or token that is generated by and/or transmitted from a computing device (e.g., based on user interaction with a client device) to a management system (e.g., card-based collaborative workflow management system) as an indication that a client device has made the request or launched a session. In some embodiments, the card-based collaborative workflow management user interface session launch indication is associated with a variety of metadata such as one or more of a user identifier, at least one feature identifier, and/or other data for use in generating, managing, and/or otherwise supporting a card-based collaborative workflow management system as described herein. In some embodiments, a card-based collaborative workflow management user interface session launch indication is associated with one or more feature interface elements that are in turn each associated with a particular feature/functionality.

The term "feature processing server" refers to a software platform and associated hardware that is configured to manage one or more feature interface element(s) in association with card-based collaborative workflow management system. The feature processing server may be accessible via one or more computing devices and is configured to, inter alia, monitor user interaction with a card-based collaborative workflow management user interface, receive card-based collaborative workflow management user interface session launch indication(s), identify and/or retrieve user data object(s) and feature data object(s) that are associated with particular user identifiers (e.g., by accessing a user data depository and/or feature data repository), perform one or more operations with respect to the user data object(s) and/or feature data object(s), generate predictive outputs associated therewith, and generate and provide data objects (e.g., feature preload data object(s)) that are configured to cause rendering of and/or updating of one or more feature interface elements. The functionality of the feature processing server may be provided via a single server or a collection of servers having a common functionality, or the functionality of the feature processing server may be segmented among a plurality of servers or collections of servers performing subsets of the described functionality of the feature processing server, such as in a cloud networking environment.

The term "feature identifier" refers to one or more items of data by which a feature may be identified within a card-based collaborative workflow management system. For example, a feature identifier may comprise text string(s), numerical character(s), alphabetical character(s), alphanumeric code(s), ASCII character(s), a pointer, an IP address, a MAC address, a memory address, other unique identifier, or a combination thereof.

The term "feature interface element" refers to a visual representation that is rendered to, or as a portion of, a card-based collaborative workflow management user interface in a card-based collaborative workflow management system and is configured to visually convey or depict information associated with a feature of the card-based collaborative workflow management system to an end-user. In some embodiments, a user may engage/interact with a feature interface element via a card-based collaborative workflow management user interface. In various embodiments, feature interface elements comprise links, windows, user-selectable data objects (e.g., tabs), images, text, and/or the like. For example, the feature interface elements 301, 302, and 310A of FIG. 3A are examples of feature interface elements. In some embodiments, a feature interface element may be identified (e.g., flagged, selected, or otherwise designated) as a preload feature interface element or a non-preload interface element, as discussed below.

The term "feature engagement parameter" refers to a programmatically generated value that is determined by a feature processing server based at least in part on an analysis of one or more of a user data object/user activity data log. In some embodiments, the feature engagement parameter correlates to or describes user engagement with a particular feature interface element, such as an engagement/interaction time period and/or interaction frequency with respect to particular feature interface element, feature identifier, and/or the like. In some embodiments, the feature processing server may cause or facilitate storage of feature engagement parameters in a repository, such as user data repository and/or feature data repository.

The term "feature engagement threshold" refers to a parameter, condition, value, or the like that defines a user engagement criteria with respect to a feature identifier that must be satisfied, achieved, present, and/or met. For example, in some embodiments, a feature processing server is configured to determine whether a feature engagement parameter (e.g., value) associated with a selected feature identifier and user identifier satisfies a feature engagement threshold as part of a determination relating to whether a feature interface element should be preloaded to a client device cache for customized low latency rendering of a feature interface element (e.g., based at least in part on one or more characteristics of a particular user and/or historical user interactions determined from analysis of a user activity data log). In some embodiments, the feature engagement threshold may describe an inferred determination relating to whether a user is likely to engage with at least one feature interface element. In some embodiments, a feature engagement threshold may be related to/associated with a feature interface element set defining a plurality of interrelated or interdependent feature interface elements (e.g., a plurality of nested feature interface elements).

Additionally and/or alternatively, a feature processing server may determine whether a feature engagement parameter associated with a selected feature identifier and user identifier satisfies a feature engagement threshold associated with the feature identifier as part of a determination relating to a feature interface element set preloading order. In some embodiments, the feature engagement threshold may be a configurable parameter relating to a user engagement/interaction time period associated with a feature interface element. In some embodiments, a feature engagement threshold is a user-selected parameter (e.g., defined by a feature administrator, technician, or developer). A feature engagement threshold may be a variable/configurable parameter or criteria related to, for example, engagement with another (e.g., related) feature interface element, an interaction count (e.g., a count of historical page loads associated with a feature interface element/feature identifier), a feature interface element size, combinations thereof, and/or the like. The exemplary feature engagement threshold may be stored in association with its corresponding feature identifier in a repository, such as a feature data repository. In some examples, meeting or exceeding the feature engagement threshold triggers various data management/processing operations including, for example, generation and/or transmission of a feature preload data object to a client device.

The term "feature preload data object" refers to structured data and computer-executable instructions that are used to generate feature interface elements as part of a card-based collaborative workflow management user interface. For example, the feature preload data object can be used to facilitate preloading to a client device cache for customized low latency rendering of at least one feature interface element. In some embodiments, the feature preload data object is generated by a feature processing server and is transmitted in response to a request from a client device. As noted above, the feature preload data object can be generated based on satisfaction of a feature engagement threshold relating to whether a user is likely to engage with at least one feature interface element. In some embodiments, the feature preload data object is an output of a feature engagement prediction machine learning model. In some embodiments, an exemplary feature preload data object defines or designates certain feature interface elements from a feature interface element set as preload feature interface element(s) and other feature interface elements from the feature interface element set as non-preload feature interface elements. In some embodiments, the feature preload data object includes or defines a feature interface element set preloading order defining a preloading order/processing order with respect to a plurality of feature interface elements. For example, the feature preload data object may be used to trigger preloading of a plurality of features in an optimal order. In some embodiments, a feature preload data object may define or describe interdependencies between feature interface elements in order to facilitate preloading of certain feature interface elements in a non-initial card-based collaborative workflow management user interface in response to user interactions (e.g., during a subsequent portion of a card-based collaborative workflow management user interface session). In some embodiments, the feature preload data object can be configured to trigger preloading of at least one secondary feature in response user interaction with a particular feature interface element. In some embodiments, the feature preload data object includes or comprises a feature preload data object validity period defining a time period during which the feature preload data object can be used to perform feature preload data object processing operations (e.g., render feature interface elements as part of a card-based collaborative workflow management user interface). By way of example, a feature preload data object validity period can be 1 day or 7 days. Accordingly, a card-based collaborative workflow management user interface (e.g., utilizing an example feature preload data object) may preload a plurality of feature interface elements based on the feature preload data object for a time period beginning with initiation of a particular session (e.g., beginning with a card-based collaborative workflow management user interface session launch indication) and subsequently cease preloading operations in an instance in which the feature preload data object validity period elapses or ends. Subsequent to expiration of a feature preload data object validity period, an example feature preload data object can be automatically deleted or removed from a client device cache. In some embodiments, expiration of the feature preload data object validity period can trigger an automatic request generated by the client device for a new feature preload data object to be transmitted by the feature processing server.

The term "feature interface element set preloading order" refers to an optimal order for preloading a plurality of feature interface elements as part of a card-based collaborative workflow management user interface. In some embodiments, the feature interface element set preloading order is an output of a feature processing server and/or feature engagement prediction machine learning model.

The term "feature engagement prediction machine learning model" refers to a data object that describes steps/operations, hyper-parameters, and/or parameters of a machine learning model that is configured to generate one or more predictive outputs (e.g., a feature preload data object) with respect to a user data object and/or feature data object. For example, the feature engagement prediction machine learning model may be configure to determine an optimal preloading order and/or preload event time period(s) with respect to a plurality of features interface elements. The steps/operations of the feature engagement prediction machine learning model may lead to providing one or more feature preload data objects for use in generating and/or updating user interface data comprising feature interface elements. The feature engagement prediction machine learning model may be trained based at least in part on a ground-truth feature data object. The ground-truth feature data object may be a data object describing data/information associated with a subset of users (e.g., obtained from user activity logs). For example, the feature engagement prediction machine learning model may be trained based at least in part on historical feature data associated with the at least one feature identifier and one or more user activity data logs. In some embodiments, the feature engagement prediction machine learning model may be configured to identify, based at least in part on user data and/or feature data, whether at least one feature engagement parameter associated with at least one feature identifier satisfies a feature engagement threshold. In some embodiments (e.g., in an instance in which the at least one the feature engagement parameter associated with at least one feature identifier satisfies a feature engagement threshold), the feature engagement prediction machine learning model may be configured to generate a feature preload data object. An example of an feature engagement prediction machine learning model may comprise an unsupervised learning structure, a supervised learning structure, a reinforcement learning structure, a deep learning structure, or the like.

The terms "feature data" or "feature data object" refers to a data object describing one or more items of data related to a feature of a card-based collaborative workflow management system, including but not limited to, a feature identifier and feature engagement data/information.

The term "feature data repository" refers to a location, such as a database stored on a memory device, which is accessible by one or more computing devices for retrieval and storage of feature data objects describing data/information associated with feature interface elements. For example, the feature data repository may comprise one or more of user identifiers, feature identifiers, feature engagement data/information, user activity data logs, and/or the like. The feature data repository may be a dedicated device and/or a part of a larger repository. The feature data repository may be dynamically updated or be static. In some embodiments, the feature data repository is encrypted in order to limit unauthorized access of such feature data.

The term "session identifier" refers to information and/or data that uniquely identifies a particular user session or application instance in the card-based collaborative workflow management system. In some embodiments, a user accesses a card-based collaborative workflow management system via a user session established and/or authenticated with the card-based collaborative workflow management system. In some embodiments, a user session is defined by an initiation of the user session and a termination of the user session. In some embodiments, a user may access the card-based collaborative workflow management system via one or more user sessions, each user session assigned a different session identifier. For example, in a non-limiting example, in an instance wherein a user accesses the card-based collaborative workflow management system via two browser tabs or sessions, each user session is assigned a different session identifier. A session identifier may comprise text string(s), numerical character(s), alphabetical character(s), alphanumeric code(s), ASCII character(s), a pointer, an IP address, a MAC address, a memory address, other unique identifier, or a combination thereof.

The term "user activity data log" refers to structured data that is generated by the feature processing server and, in some embodiments, is stored to a repository, such as a user data repository and/or a feature data repository. The user activity data log documents engagement/interaction by a user with one or more feature interface elements of a card-based collaborative workflow management user interface. Example user activity data logs include user engagement data that tracks or embodies direct interactions (e.g., clicks, selections) and/or implied/passive interactions (e.g., hovers) by a user. For example, in some embodiments, the user activity data log includes one or more of user identifier(s), feature identifier(s), session identifier(s), user interaction data, timestamp(s), and/or the like.

For example, in some embodiments, user engagement with a feature interface element rendered to a card-based collaborative workflow management user interface generates a feature engagement indication associated with a corresponding feature identifier and user identifier. The feature processing server may generate, maintain, and/or update user activity data log(s) to include feature engagement indications stored in association with the selected feature identifier and the user identifier. In another example, the feature processing server generates, maintains, and/or updates a user activity data log to include feature engagement indications associated with a feature identifier and user identifier in an instance wherein the feature interface element is rendered to a card-based collaborative workflow management user interface such that it continues to be viewable to a user during the current session. The user activity data log can be analyzed by the feature processing server to determine one or more features or attributes associated with the user engagement indications. In some embodiments, the feature processing server utilizes such user activity data logs to monitor, track, and/or analyze feature engagement parameters and metrics (e.g., based on user engagement data/information associated with the feature identifiers) to generate predictive outputs. By way of example, the feature processing server may analyze user activity data logs in order to identify preload feature interface elements, identify non-preload feature interface elements, and/or determine a feature interface element set preloading order with respect to a plurality of feature interface elements (e.g., using a feature engagement prediction machine learning model).

The terms "user data" or "user data object" refer to a collection of data associated with a user that is capable of being transmitted, received, and/or stored. In some embodiments, user data comprises data associated with a user which defines and/or identifies the user within a card-based collaborative workflow management system. For example, user data may comprise one or more of a user identifier, user profile data, user system initiation timestamp, and/or the like. The user data can include a subset designation of user credentials, such as, for example, login information for the user for the card-based collaborative workflow management system including the user's username and password. The user data may comprise historical user interaction data with the card-based collaborative workflow management user interface. For example, in some embodiments, the user data comprises feature data describing user interactions with one or more feature interface elements. For example, user data may comprise one or more of a feature identifier, a user activity data log, and/or the like. In certain embodiments, user data may be stored in a user data repository.

The term "user identifier" refers to one or more items of data by which a user may be identified within a card-based collaborative workflow management system. For example, a user identifier may comprise text string(s), numerical character(s), alphabetical character(s), alphanumeric code(s), ASCII character(s), a pointer, an IP address, a MAC address, a memory address, other unique identifier, or a combination thereof.

The term "user data repository" refers to a location, such as a database stored on a memory device, which is accessible by one or more computing devices for retrieval and storage of user data and other data associated with feature interface elements. For example, the user data repository may include one or more of user identifiers, feature identifiers, user profile data, user credentials, user system initiation timestamps, feature engagement data/information, user activity data logs, and/or the like. The user data repository may be a dedicated device and/or a part of a larger repository. The user data repository may be dynamically updated or be static. In some embodiments, the user data repository is encrypted in order to limit unauthorized access of such user data.

The terms "user engagement" or "user interaction" refer to user activity with respect to a graphical user interface, such as within a card-based collaborative workflow management user interface or components thereof. Such user engagement or user interaction with the card-based collaborative workflow management user interface or components thereof can be via a multitude of interactions, such as, but not limited to, "non-keystroke engagement" or "keystroke engagement." Non-keystroke engagement refers to user interaction in which such user interaction is free from (i.e., excludes) the entering of one or more (e.g., keystroke) characters into a card-based collaborative workflow management user interface. For example, touch-screen or mouse click engagement are examples of non-keystroke engagement. The term "keystroke engagement" refers to entering of one or more keystrokes into a component of the card-based collaborative workflow management user interface. For example, input of one or more characters (e.g., alphanumeric characters or emojis) into a component of the card-based collaborative workflow management user interface is one example of keystroke engagement. In some embodiments, user engagement data/information may be stored as values describing one or more attributes of user interaction by a particular user with respect to a selected feature interface element of a card-based collaborative workflow management system. Different types of engagement including direct interactions (e.g., clicks or data entries) and/or implicit/passive interactions (e.g., viewing and/or scrolling over without explicit, express, or direct interaction) can be assigned, weighted, and/or otherwise valued differently with respect to a particular feature. For example, in some embodiments, explicit, express, or direct interaction with, selection of, and/or engagement with a feature interface element associated with a feature by a user via a client device may be assessed and/or assigned a relative value, a negative relative value or the like in determining a feature engagement parameter or value with respect to the particular feature for the user.

The term "timestamp" refers to a data field comprising a sequence of characters or encoded information identifying when a certain event occurs. A timestamp is captured by a computing device of a card-based collaborative workflow management system (e.g., a feature processing server or the like), stored in one or more repositories (e.g., user data repository, feature data repository, or the like), and/or transmitted to a feature processing server. In some embodiments, a timestamp is captured, converted to, and/or stored in a primary time standard. For example, in some embodiments, one or more timestamps are captured, converted to, and/or stored according to a network time standard or Coordinated Universal Time (UTC) global standard, thereby allowing calculations and comparisons to be performed regardless of source. In some embodiments, a timestamp is captured and/or represented to the level of milliseconds.

The term "user system initiation timestamp" refers to a data field comprising a sequence of characters or encoded information (e.g., timestamp) identifying when a user first established an account with the card-based collaborative workflow management system. The user system initiation timestamp is captured by a computing device of a card-based collaborative workflow management system (e.g., a feature processing server or the like), stored in one or more repositories (e.g., user data repository, feature data repository, or the like), and transmitted to a feature processing server. In some embodiments, a user system initiation timestamp is captured, converted to, and/or stored in a primary time standard. For example, in some embodiments, one or more user system initiation timestamps are captured, converted to, and/or stored according to a Coordinated Universal Time (UTC) global standard, thereby allowing calculations and comparisons to be performed regardless of source.

The terms "client device", "computing device", "user device", and the like may be used interchangeably to refer to computer hardware that is configured (either physically or by the execution of software) to access one or more of an application, service, or repository made available by a server (e.g., apparatus of the present disclosure) and, among various other functions, is configured to directly, or indirectly, transmit and receive data. The server is often (but not always) on another computer system, in which case the client device accesses the service by way of a network. Example client devices include, without limitation, smart phones, tablet computers, laptop computers, wearable devices (e.g., integrated within watches or smartwatches, eyewear, helmets, hats, clothing, earpieces with wireless connectivity, and the like), personal computers, desktop computers, enterprise computers, the like, and any other computing devices known to one skilled in the art in light of the present disclosure. In some embodiments, a client device is associated with a user. In some embodiments, an association is created by a client device transmitting authentication information associated with the user to the card-based collaborative workflow management system (e.g., feature processing server).

The terms "data," "data object" "content," "digital content," "digital content object," "signal", "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media.

However, it will be appreciated that where embodiments are described to use a computer-readable storage medium, other types of computer-readable mediums can be substituted for or used in addition to the computer-readable storage medium in alternative embodiments.

The terms "application," "software application," "app," "product," "service" or similar terms refer to a computer program or group of computer programs designed to perform coordinated functions, tasks, or activities for the benefit of a user or group of users. A software application can run on a server or group of servers (e.g., physical or virtual servers in a cloud-based computing environment). In certain embodiments, an application is designed for use by and interaction with one or more local, networked, or remote computing devices, such as, but not limited to, client devices. Non-limiting examples of an application comprise workflow engines, service desk incident management, team collaboration suites, cloud services, word processors, spreadsheets, accounting applications, web browsers, email clients, media players, file viewers, videogames, audio-video conferencing, and photo/video editors. In some embodiments, an application may be a cloud-based product.

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "plurality" refers to two or more items.

The term "set" refers to a collection of one or more items.

The term "or" is used herein in both the alternative and conjunctive sense, unless otherwise indicated.

Having set forth a series of definitions called-upon throughout this application, an example system architecture and example apparatus is described below for implementing example embodiments and features of the present disclosure.

Example System Architecture

Methods, apparatuses, systems, and computer program products of the present disclosure may be embodied by any of a variety of computing devices. For example, the method, apparatus, system, and computer program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation.

Still further, example embodiments may be embodied by any of a variety of mobile devices, such as a portable digital assistant (PDA), mobile telephone, smartphone, laptop computer, tablet computer, wearable, or any combination of the aforementioned devices.

With reference to FIG. 1, an example computing system 100 within which some embodiments of the present disclosure operate is illustrated. In particular, FIG. 1 illustrates an example card-based collaborative workflow management system 200 configured to communicate with one or more client devices 101A-101N in accordance with some example embodiments described herein. Users may access a card-based collaborative workflow management system 200 via a communications network 102 using one or more of client devices 101A-101N. Card-based collaborative workflow management system 200 may comprise a feature processing server 210 in communication with at least one repository, such as feature data repository 215 and/or user data repository 225. Such repository(ies) may be hosted by the feature processing server 210 or otherwise hosted by devices in communication with the feature processing server 210. The card-based collaborative workflow management system 200 is, in some embodiments, able to generate and output feature interface element(s) for rendering to a card-based collaborative workflow management user interface associated with a user identifier, as will be described below.

Feature processing server 210 may include circuitry, networked processors, or the like configured to perform some or all of the feature processing server-based processes described herein (e.g., receiving card-based collaborative workflow management user interface session launch indication(s), retrieving feature data and/or user data, determining a feature value, causing rendering of feature interface element(s) and to the card-based collaborative workflow management user interface displayed on one or more client devices 101A-101N, etc.), and may be any suitable network server and/or other type of processing device. In this regard, the feature processing server 210 may be embodied by any of a variety of devices, for example, the feature processing server 210 may be embodied as a computer or a plurality of computers. For example, feature processing server 210 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, feature processing server 210 may be located remotely from the feature data repository 215 and/or the user data repository 225, although in other embodiments, the feature processing server 210 may comprise the feature data repository 215 and/or the user data repository 225. The feature processing server 210 may, in some embodiments, comprise several servers or computing devices performing interconnected and/or distributed functions. Despite the many arrangements contemplated herein, feature processing server 210 is shown and described herein as a single computing device to avoid unnecessarily overcomplicating the disclosure.

Feature processing server 210 can communicate with one or more client devices 101A-101N via communications network 102. Communications network 102 may include any one or more wired and/or wireless communication networks including, for example, a wired or wireless local area network (LAN), personal area network (PAN), metropolitan area network (MAN), wide area network (WAN), or the like, as well as any hardware, software and/or firmware required for implementing the one or more networks (e.g., network routers, switches, hubs, etc.). For example, communications network 102 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the card-based collaborative workflow management system 200.

Feature data repository 215 may be stored by any suitable storage device configured to store some or all of the information described herein (e.g., memory 201 of the feature processing server 210 or a separate memory system separate from the feature processing server 210, such as one or more database systems, backend data servers, network databases, cloud storage devices, or the like provided by another device (e.g., online application or 3$^{rd}$ party provider), such as a Network Attached Storage (NAS) device or devices, or as a separate database server or servers). Feature data repository 215 may comprise data received from the feature processing server 210 (e.g., via a memory 201 and/or processor(s) 202) and/or a client device 101A-101N, and the corresponding storage device may thus store this data. Feature data repository 215 includes information accessed and stored by the feature processing server 210 to facilitate the operations of the card-based collaborative workflow management system 200. As such, feature data repository 215 may include, for example, without limitation, one or more of feature data, feature identifier(s), session identifier(s), user identifier(s), feature engagement data/information, user activity data logs, and/or the like.

User data repository 225 may be stored by any suitable storage device configured to store some or all of the information described herein (e.g., memory 201 of the feature processing server 210 or a separate memory system separate from the feature processing server 210, such as one or more database systems, backend data servers, network databases, cloud storage devices, or the like provided by another device (e.g., online application or 3$^{rd}$ party provider), such as a Network Attached Storage (NAS) device or devices, or as a separate database server or servers). User data repository 225 may comprise data received from the feature processing server 210 (e.g., via a memory 201 and/or processor(s) 202) and/or a client device 101A-101N, and the corresponding storage device may thus store this data. User data repository 225 includes information accessed and stored by the feature processing server 210 to facilitate the operations of the card-based collaborative workflow management system 200. As such, user data repository 225 may include, for example, without limitation, one or more of user data, user identifier(s), user profile data, user credentials, user system initiation timestamp(s), feature data, feature identifier(s), user identifiers, feature identifiers, user profile data, user credentials, user system initiation timestamps, feature engagement data/information, user activity data logs, and/or the like.

The client devices 101A-101N may be implemented as any computing device as defined above. That is, the client devices 101A-101N may also include circuitry, networked processors, or the like configured to perform some or all of the apparatus-based processes described herein, and may include a suitable network server and/or other type of processing device (e.g., a controller or computing device of the client devices 101-101N). Electronic data received by the feature processing server 210 from the client devices 101A-101N may be provided in various forms and via various methods. For example, the client devices 101A-101N may include desktop computers, laptop computers, smartphones, netbooks, tablet computers, wearables, and/or other networked device, that may be used for any suitable purpose in addition to presenting the collaborative contextual summary interface to a user and otherwise providing access to the card-based collaborative workflow management system 200. The depictions in FIG. 1 of "N" client devices are merely for illustration purposes. According to some embodiments, the client devices 101A-101N may be configured to display an interface on a display of the client device for viewing, editing, and/or otherwise interacting with at least one feature interface element, which may be provided by the card-based collaborative workflow management system 200.

In embodiments where a client device 101A-101N is a mobile device, such as a smartphone or tablet, the client device 101A-101N may execute an "app" to interact with the card-based collaborative workflow management system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. The mobile operating systems named above each provide frameworks for interacting with, for example, wired and wireless network interfaces, user contacts, and other applications. Communication with hardware and software modules executing outside of the app is typically provided via application programming interfaces (APIs) provided by the mobile device operating system. Additionally, or alternatively, the client device 101A-101N may interact with the card-based collaborative workflow management system 200 via a web browser. As yet another example, the client devices 101A-101N may include various hardware or firmware designed to interface with the card-based collaborative workflow management system 200.

Example Apparatus for Implementing Embodiments of the Present Disclosure

FIG. 2 shows a schematic block diagram of example circuitry, some or all of which may be included in a feature processing server 210. In accordance with some example embodiments, feature processing server 210 may include various means, such as memory 201, processor 202, input/output circuitry 203, and/or communications circuitry 204. Moreover, in some embodiments, feature processing circuitry 205 may also or instead be included in the feature processing server 210. For example, where feature processing circuitry 205 is included in feature processing server 210, feature processing circuitry 205 may be configured to facilitate the functionality discussed herein regarding generating a feature preload data object and causing rendering of feature interface element(s). An apparatus, such as feature processing server 210, may be configured, using one or more of the circuitry 201, 202, 203, 204, and 205, to execute the operations described above with respect to FIG. 1 and below in connection with FIG. 5, FIG. 6A and FIG. 6B.

Although the use of the term "circuitry" as used herein with respect to components 201-205 are described in some cases using functional language, it should be understood that the particular implementations necessarily include the use of particular hardware configured to perform the functions associated with the respective circuitry as described herein. It should also be understood that certain of these components 201-205 may include similar or common hardware. For example, two sets of circuitry may both leverage use of the same processor, network interface, storage medium, or the like to perform their associated functions, such that duplicate hardware is not required for each set of circuitry. It will be understood in this regard that some of the components described in connection with the feature processing server 210 may be housed within this device, while other components are housed within another of these devices, or by yet another device not expressly illustrated in FIG. 1.

While the term "circuitry" should be understood broadly to include hardware, in some embodiments, the term "circuitry" also includes software for configuring the hardware. For example, in some embodiments, "circuitry" may include processing circuitry, storage media, network interfaces, input/output devices, and the like. In some embodiments, other elements of the feature processing server 210 may provide or supplement the functionality of particular circuitry. For example, the processor 202 may provide processing functionality, the memory 201 may provide storage functionality, the communications circuitry 204 may provide network interface functionality, and the like.

In some embodiments, the processor 202 (and/or co-processor or any other processing circuitry assisting or otherwise associated with the processor) may be in communication with the memory 201 via a bus for passing information among components of, for example, feature processing server 210. The memory 201 is non-transitory and may include, for example, one or more volatile and/or non-volatile memories, or some combination thereof. In other words, for example, the memory 201 may be an electronic storage device (e.g., a non-transitory computer readable storage medium). The memory 201 may be configured to store information, data, content, signals, applications, instructions (e.g., computer-executable program code instructions), or the like, for enabling an apparatus, e.g., feature processing server 210, to carry out various functions in accordance with example embodiments of the present disclosure. For example, memory 201 may be configured to store user data, feature data, user identifier(s), feature identifier(s), session identifier(s), feature engagement data parameter(s), timestamp(s), user system initiation timestamp(s), user activity data log(s), user feature engagement data, and/or any other suitable data or data structures. It will be understood that the memory 201 may be configured to store partially or wholly any electronic information, data, data structures, embodiments, examples, figures, processes, operations, techniques, algorithms, instructions, systems, apparatuses, methods, or computer program products described herein, or any combination thereof.

Although illustrated in FIG. 2 as a single memory, memory 201 may comprise a plurality of memory components. The plurality of memory components may be embodied on a single computing device or distributed across a plurality of computing devices. In various embodiments, memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 201 may be configured to store information, data, applications, instructions, or the like for enabling feature processing server 210 to carry out various functions in accordance with example embodiments discussed herein. For example, in at least some embodiments, memory 201 is configured to buffer data for processing by processor 202. Additionally or alternatively, in at least some embodiments, memory 201 is configured to store program instructions for execution by processor 202. Memory 201 may store information in the form of static and/or dynamic information. This stored information may be stored and/or used by feature processing server 210 during the course of performing its functionalities.

Processor 202 may be embodied in a number of different ways and may, for example, include one or more processing devices configured to perform independently. Additionally, or alternatively, processor 202 may include one or more processors configured in tandem via a bus to enable independent execution of instructions, pipelining, and/or multithreading. Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, processor 202 comprises a plurality of processors. The plurality of processors may be embodied on a single computing device or may be distributed across a plurality of such devices collectively configured to function as feature processing server 210. The plurality of processors may be in operative communication with each other and may be collectively configured to perform one or more functionalities of feature processing server 210 as described herein.

In an example embodiment, processor 202 is configured to execute instructions stored in the memory 201 or otherwise accessible to processor 202. Alternatively, or additionally, the processor 202 may be configured to execute hardcoded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure processor 202 to perform one or more algorithms and/or operations described herein when the instructions are executed. For example, these instructions, when executed by processor 202, may cause feature processing server 210 to perform one or more of the functionalities of feature processing server 210 as described herein.

In some embodiments, feature processing server 210 further includes input/output circuitry 203 that may, in turn, be in communication with processor 202 to provide an audible, visual, mechanical, or other output and/or, in some embodiments, to receive an indication of an input from a user, a client device 101A-101N, or another source. In that sense, input/output circuitry 203 may include means for performing analog-to-digital and/or digital-to-analog data conversions. Input/output circuitry 203 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output circuitry 203 may comprise a user interface and may comprise a web user interface, a mobile application, a kiosk, or the like. The processor 202 and/or user interface circuitry comprising the processor 202 may be configured to control one or more functions of a display or one or more user interface elements through computer program instructions (e.g., software and/or firmware) stored on a memory accessible to the processor 202 (e.g., memory 201, and/or the like). In some embodiments, aspects of input/output circuitry 203 may be reduced as compared to embodiments where feature processing server 210 may be implemented as an end-user machine or other type of device designed for complex user interactions. In some embodiments (like other components discussed herein), input/output circuitry 203 may even be eliminated from feature processing server 210. Input/output circuitry 203 may be in communication with memory 201, communications circuitry 204, and/or any other component(s), such as via a bus. Although more than one input/output circuitry and/or other component can be included in feature processing server 210, only one is shown in FIG. 2 to avoid overcomplicating the disclosure (e.g., like the other components discussed herein).

Communications circuitry 204, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with feature processing server 210. In this regard, communications circuitry 204 may include, for example, a network interface for enabling communications with a wired or wireless communication network. For example, in some embodiments, communications circuitry 204 is configured to receive and/or transmit any data that may be stored by memory 201 using any protocol that may be used for communications between computing devices. For example, communications circuitry 204 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, communications circuitry 204 includes circuitry for interacting with the antenna(s) to cause transmission of signals via the antenna(e) or to handle receipt of signals received via the antenna(e). These signals may be transmitted by feature processing server 210 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 204 may additionally or alternatively be in communication with the memory 201, input/output circuitry 203 and/or any other component of feature processing server 210, such as via a bus.

In some embodiments, feature processing circuitry 205 may also or instead be included and configured to perform the functionalities discussed herein related to, inter alia, generating a feature preload data object that can be used to cause rendering of feature interface element(s). In some embodiments, feature processing circuitry 205 includes hardware, software, firmware, and/or a combination of such components, configured to support various aspects of such feature interface element-related functionality, features, and/or services of the feature processing server 210 as described herein (e.g., designed and/or configured to receive, process, generate, and transmit data such as, but not limited to, feature preload data object(s), user data, and/or feature data, determine whether feature engagement parameter(s) satisfy feature engagement threshold(s), and causing rendering of feature interface element(s)) based at least in part on satisfaction of various criteria. In some embodiments, the feature processing circuitry 205 analyzes user data and/or feature data (e.g., user system initiation data value(s), current timestamp(s), and feature engagement data/value(s)) to determine a feature engagement parameter/value for each of one or more feature identifiers and causes rendering of a feature interface element. For example, in some embodiments, the feature processing circuitry 205 determines a feature engagement parameter/value for each feature identifier based at least in part on user system initiation data value(s), current timestamp(s), and user feature engagement data/value(s). In some embodiments, the feature processing circuitry 205 determines (e.g., using a feature engagement prediction machine learning model) if one or more feature engagement parameters satisfy or fail to satisfy feature engagement threshold(s). In response to determining that the feature engagement parameter/value(s) satisfy a corresponding feature engagement threshold for a selected feature identifier, in certain embodiments, the feature processing circuitry 205 may identify preload feature interface elements, non-preload feature interface elements, and determine a feature interface element set preloading order. Additionally, the feature processing circuitry 205 may generate a feature preload data object and output the feature preload data object to a card-based collaborative workflow management user interface. The feature preload data object may be used to generate feature interface element(s). By way of example, the feature preload data object may comprise computer-executable instructions that are configured to cause display by the input/output circuitry 203, the communications circuitry 204, or both for causing rendering of a feature interface element to the card-based collaborative workflow management user interface in association with a feature interface element corresponding to at least one feature identifier.

It should be appreciated that in some embodiments, feature processing circuitry 205 performs one or more of such exemplary actions in combination with another set of circuitry of the feature processing server 210, such as one or more of memory 201, processor 202, input/output circuitry 203, and communications circuitry 204. For example, in some embodiments, feature processing circuitry 205 utilizes processing circuitry, such as the processor 202 and/or the like, to perform one or more of its corresponding operations. In a further example, in some embodiments, some or all of the functionality of feature processing circuitry 205 may be performed by processor 202. In this regard, some or all of the example processes and algorithms discussed herein can be performed by at least one processor 202 and/or feature processing circuitry 205. It should also be appreciated that, in some embodiments, feature processing circuitry 205 may include a separate processor, specially configured field programmable gate array (FPGA), or application specific interface circuit (ASIC) to perform its corresponding functions.

Additionally or alternatively, in some embodiments, feature processing circuitry 205 utilizes memory 201 to store collected information. For example, in some implementations, feature processing circuitry 205 includes hardware, software, firmware, and/or a combination thereof, that interacts with feature data repository 215, user data repository 225, and/or memory 201 to send, retrieve, update, and/or store data values embodied by and/or associated with a feature interface element including, but not limited to, user data, feature data, user identifier(s), feature identifier(s), session identifier(s), feature engagement threshold(s), feature engagement parameters/value(s), timestamp(s) (e.g., user system initiation timestamp(s)), user activity data log(s), and associated data that is configured for association with, for example, determining feature engagement parameters/value(s), and to support the operations of the feature processing circuitry 205 and the remaining circuitry. Additionally or alternatively, in some embodiments, feature processing circuitry 205 utilizes input/output circuitry 203 to facilitate user output (e.g., causing rendering of one or more user interface component(s) such as feature interface element(s), and/or to receive user input (e.g., user clicks, user taps, keyboard interactions, user gesture, and/or the like). Additionally or alternatively still, in some embodiments, the feature processing circuitry 205 utilizes communications circuitry 204 to initiate transmissions to another computing device, receive transmissions from another computing device, communicate signals between the various sets of circuitry as depicted, and/or the like.

Accordingly, non-transitory computer readable storage media can be configured to store firmware, one or more application programs, and/or other software, which include instructions and/or other computer-readable program code portions that can be executed to control processors of the components of feature processing server 210 to implement various operations, including the examples shown herein. As such, a series of computer-readable program code portions may be embodied in one or more computer program products and can be used, with a device, feature processing server 210, database, and/or other programmable apparatus, to produce the machine-implemented processes discussed herein. It is also noted that all or some of the information discussed herein can be based on data that is received, generated and/or maintained by one or more components of the feature processing server 210. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as systems, methods, apparatuses, computing devices, personal computers, servers, mobile devices, back-end network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions embodied in the computer-readable storage medium (e.g., computer software stored on a hardware device). Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein in connection with the components of feature processing server 210 and client devices 101A-101N.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML, page) to a client device (e.g., for purposes of displaying information/data to and receiving user input from a user interacting with a client device or an admin user interacting with an admin device). Information/data generated at the client device (e.g., as a result of the user interaction with an admin device) can be received from the client device (e.g., client device or admin device) at the server.

In various embodiments of the present disclosure, an apparatus (e.g., feature processing server 210) is configured to manage rendering of at least one feature interface element in association with a card-based collaborative workflow management system 200. FIG. 3A, FIG. 3B, and FIG. 3C depict example card-based collaborative workflow management user interfaces 300 in accordance with example embodiments of the present disclosure.

Additionally, FIG. 3A, FIG. 3B, and FIG. 3C illustrate example feature interface elements 301, 302, 310A, 310B, 310C, and 310D structured in accordance with example embodiments of the present disclosure. It should be appreciated that the depicted feature interface elements are exemplary. Examples of feature interface elements associated with a feature identifier include, but are not limited to, an icon, text, and/or background displayed in a graphical user interface (e.g., card-based collaborative workflow management user interface 300). In some embodiments, the card-based collaborative workflow management user interface 300 comprises one or more user-selectable interface elements 301 and 302 which may further be associated with a particular feature interface element 310. In the example illustrated in FIG. 3A, a user may engage/select a particular user-selectable interface element which may cause the card-based collaborative workflow management user interface 300 to render a corresponding feature interface element or sub-feature interface element (as depicted, user engagement/selection of feature interface element 302 in FIG. 3B, i.e., the "Filter" user-interface element, may cause rendering of a corresponding "Filter" feature interface element 310C providing a search bar feature/filtering functionality).

In some embodiments, as illustrated, each feature interface element (e.g., feature interface element 310A in FIG. 3A) comprises one or more renderings of feature interface sub-elements (e.g., feature interface sub-elements 305A comprising card data object(s), board data object(s), and/or list data object(s)) to enable collaboration among users as depicted in FIG. 3A. For example, in some embodiments, a feature interface sub-element may be or comprise a card data object representing one or more tasks associated with a team or group of users in the card-based collaborative workflow management system 200. In some embodiments, one or more card data objects are associated with a list data object, which represents a list of tasks associated with the team or group of users. In still further embodiments, one or more card data objects and/or one or more list data objects are associated with a board data object such that the board data object is an organized set of the one or more list data objects and/or the one or more card data objects. As depicted in FIG. 3A, a feature interface element 310A (as depicted, "Goal 1") comprises a plurality of board data objects (e.g., as shown, "Easy" and "Hard"). The plurality of board data objects may define a list data object or card data object representing a subset of tasks associated with the feature interface element 310A. As such, a card-based collaborative workflow management interface 300 allows users to interact with a card-based collaborative workflow management system 200, allowing such user or a group of users to manage various tasks based at least in part on the renderings of one or more feature interface elements (e.g., feature interface element 310A) comprising feature interface sub-element(s) (e.g., one or more card data objects, list data objects and/or board data objects).

It should be appreciated that the information depicted in the example card-based collaborative workflow management user interface 300 is exemplary, and that similar and/or alternative data, parameters, data values, and/or the like may be provided. Additionally or alternatively, in some embodiments, the layout of the various interface elements, and/or sub-interfaces of the depicted card-based collaborative workflow management user interface 300 may differ without deviating from scope of this disclosure. In some embodiments, the card-based collaborative workflow management user interface 300 is rendered to a client device, for example, client device 101A-101N associated with a user. In some embodiments, a card-based collaborative workflow management system 200 (e.g., feature processing server 210) causes rendering of the card-based collaborative workflow management user interface 300 in response to receiving a card-based collaborative workflow management user interface session launch indication from the client device 101A-101N to the card-based collaborative workflow management system 200 (e.g., feature processing server 210).

Exemplary System Operations

Having described the apparatus, system, and exemplary circuitry comprising embodiments of the present disclosure, it should be understood that the apparatus may proceed to manage a feature interface element in association with a card-based collaborative workflow management system in a number of ways. FIG. 5 is a flowchart broadly illustrating a series of operations or process blocks that are executed or performed to render a card-based collaborative workflow management user interface. The operations illustrated in FIG. 5 may, for example, be performed by, with the assistance of, and/or under control of an apparatus (e.g., client device 101A).

FIG. 6A and FIG. 6B are a flowchart and corresponding signal diagram, respectively, illustrating a series of operations or process blocks that are executed or performed to manage feature preload data object processing operations and generate feature interface elements in accordance with some example embodiments of the present disclosure. The operations illustrated in FIG. 6A, and FIG. 6B may, for example, be performed by, with the assistance of, and/or under the control of an apparatus (e.g., feature processing server 210), as described above. In this regard, performance of the operations may invoke one or more of memory 201, processor 202, input/output circuitry 203, communications circuitry 204, and/or feature processing circuitry 205.

In the embodiment illustrated in FIG. 5, the example flowchart illustrates method 500 which begins by generating a card-based collaborative management user interface session launch indication at Block 502. For example, in some embodiments, the card-based collaborative management user interface session launch indication is generated at an apparatus, e.g., a client device 101A, in response to user interaction with a card-based collaborative workflow management user interface. In this regard, the client device 101A may include means (such as a processor, input/output circuitry, communications circuitry, processing circuitry, or the like) for generating the card-based collaborative management user interface session launch indication. In certain embodiments, the card-based collaborative management user interface session launch indication is associated with a user identifier and one or more feature identifiers. As noted herein, the card-based collaborative management user interface session launch indication may cause initiation of a process that culminates in rendering a card-based collaborative workflow management user interface for a particular user. For example, the card-based collaborative workflow management user interface session launch indication is associated with a variety of metadata such as one or more of a user identifier, at least one feature identifier, and/or other data for use in generating, managing, and/or otherwise supporting a card-based collaborative workflow management system.

Referring now to FIG. 6A, the example flowchart illustrates method 600 which begins by receiving the card-based collaborative workflow management user interface session launch indication at Block 602. In some embodiments, feature processing server 210 may include means, such as the processor 202, input/output circuitry 203, communications circuitry 204, feature processing circuitry 205, or the like, for receiving the card-based collaborative workflow management user interface session launch indication.

As depicted at Block 604, in some embodiments, the feature processing server 210 includes means, such as the processor 202, input/output circuitry 203, communications circuitry 204, feature processing circuitry 205, or the like, for retrieving user data. For example, in some embodiments, the feature processing circuitry 205 generates and/or transmits signals in order to query a repository for user data using a user identifier and/or at least one feature identifier. For example, using the user identifier and the feature identifier(s) associated with the card-based collaborative workflow management user interface session launch indication received at Block 602, the feature processing server 210 queries a repository, such as user data repository 225, to access and/or retrieve user data associated with a user corresponding to the user identifier. In some embodiments, the user data can comprise a user activity data log, feature engagement data/information, and/or the like.

As depicted at Block 606, in some embodiments, the feature processing server 210 includes means, such as the processor 202, input/output circuitry 203, communications circuitry 204, feature processing circuitry 205, or the like, for retrieving feature data associated with a user identified from a feature data repository. For example, in some embodiments, the feature processing circuitry 205 generates and/or transmits signals in order to query a repository for feature data using one or more feature identifiers associated with the user data. For example, using each of the one or more feature identifiers associated with the identified user at Block 604, the feature processing server 210 queries a repository, such as feature data repository 215, to access and/or retrieve feature data associated with a feature corresponding to a selected feature identifier. Block 606 can be performed prior to, concurrently, or subsequent to Block 406. In this regard, the retrieved user data comprises at least a user system initiation timestamp and a user identifier. Block 606 can be performed prior to, concurrently, or subsequent to Block 604.

In some embodiments, the method 600 further includes generating/training a feature engagement prediction machine learning model at Block 608. For example, the feature processing server 210 may include means, such as the processor 202, communications circuitry 204, feature processing circuitry 205, or the like, for generating, preparing and/or training a feature engagement prediction machine learning model. In some embodiments, the feature processing server 210 may retrieve user data and feature data (e.g., from a user data depository and/or feature data repository) comprising feature engagement information/data associated with a plurality of users. The feature engagement prediction machine learning model may process at least a portion of the retrieved user data and feature data and generate training data for use in conjunction with one or more machine learning models (e.g., feature engagement prediction machine learning model). For example, the feature processing server 210 may process at least a portion of the user data and feature data to identify one or more features or attributes relating to whether a user or subset of users is likely to engage with at least one feature interface element.

By way of example, feature processing server 210 may determine, based at least in part on user data, that a particular user is colorblind. Accordingly, the feature processing server 210 may determine that the colorblind user is likely to engage with one or more feature interface elements that are configured for colorblind users and/or that are frequently used by one or more other colorblind users. In another example, the feature processing server 210 may determine based at least in part on feature engagement data for a plurality of users that user engagement with a first feature interface element is likely to lead to subsequent user engagement with a second feature interface element. Accordingly, it should be understood that user engagement with a particular feature interface element may be a condition for preloading another feature interface element. In some embodiments, the feature processing server can tag or label data instances describing data attributes that can be used to train the feature engagement machine learning model to generate at least one type of predictive output.

At Block 610, the method 600 further includes, determining whether feature engagement parameters satisfy a feature engagement threshold. For example, the feature processing server 210 may include means, such as the processor 202, communications circuitry 204, feature processing circuitry 205, or the like, for determining whether feature engagement parameters satisfy a feature engagement threshold (e.g., based at least in part on analysis of a user activity data log). In some embodiments, the feature processing server 210 analyzes at least a portion of the user data and feature data associated with a particular user in order to determine whether a feature engagement parameter (e.g., value) associated with a selected feature identifier and user identifier satisfies a feature engagement threshold. An exemplary feature engagement parameter may be related to a user engagement or interaction time period or frequency with respect to a particular feature interface element.

In some embodiments, the feature engagement threshold comprises a parameter, condition, value, or the like that defines a user engagement criteria with respect to a feature identifier that must be satisfied, achieved, present, and/or met. In some embodiments, the feature processing server 210 determines whether at least one feature engagement parameter satisfies a feature engagement threshold as part of a determination relating to whether a feature interface element should be preloaded to a client device cache for customized low latency rendering of a feature interface element. In further embodiments, the feature engagement threshold may describe an inferred determination relating to whether a user is likely to engage with at least one feature interface element. By way of example, a feature engagement threshold may be or be otherwise associated with a time period and frequency (e.g., average number of minutes of user engagement or interaction with a feature interface element daily over a time period of 7 days). In the above example, in an instance in which a user has engaged or interacted with a particular feature interface element for an average of 23 minutes daily over a 7 day period, then the feature processing server 210 determines that the user's engagement with the particular feature interface element fails to satisfy the feature engagement threshold. Conversely, in an instance in which the user has engaged or interacted with the feature interface element for an average of 35 minutes daily over the 7 day period, then the feature processing server 210 determines that the user's engagement with the particular feature interface element satisfies the feature engagement threshold. As noted above, in some embodiments, a feature engagement threshold may be related to historical engagement with another (e.g., interdependent, interrelated, or the like) feature interface element, a feature interface element size and/or loading latency period. For example, feature processing server 210 may designate certain feature interface elements as preload feature interface elements in an instance in which the feature interface element size and/or loading latency period associated with the feature interface elements equals or exceeds certain value(s) (e.g., equal to or exceeding 1 Kilobyte and/or 4 seconds). In some embodiments, a feature engagement threshold may be a value stored in feature data repository 215 and/or user data repository 225. In some embodiments, various features may each be associated with different feature engagement parameter(s) and/or feature engagement threshold(s). Accordingly, in some embodiments, the feature processing server 210 may retrieve and/or access a plurality of feature engagement thresholds with respect to a plurality of feature identifiers associated with the user identifier/user data at Block 610. In some embodiments, as further depicted in FIG. 6A, in response to determining that at least one feature engagement parameter fails to satisfy at least one feature engagement threshold, the method 600 may return to Block 602 or end until the feature processing server 210 receives a subsequent card-based collaborative workflow management user interface session launch indication.

In some embodiments, the feature processing server 210 optionally programmatically monitors, tracks, and/or analyzes user activity and metrics, such as based on a user's interaction with various feature interface elements as reflected in user activity logs, to determine feature engagement thresholds for different features. For example, feature processing server 210 may monitor engagement with a particular feature interface element in order to determine an appropriate feature engagement threshold value. For example, any one or more of the data described herein (e.g., feature data, user data, user activity logs, historical data, and/or the like) and correlations thereof can be used in connection with the feature engagement prediction machine learning model. For example, in some embodiments, although the varied data inputted and outputted in card-based collaborative workflow management environment is not necessarily comparable nor are the key exposure indicators necessarily selectable by a human, the dissimilar aggregate data structure formed from such complex data corpus can be analyzed by the feature engagement prediction machine learning model to programmatically determine the feature engagement thresholds. The feature engagement prediction machine leaning model may be an unsupervised learning structure, a supervised learning structure, a reinforcement learning structure, a deep learning structure, and/or the like for programmatically determining correlations of the varied data and data formats to generate predictive outputs.

As further depicted in FIG. 6A, at Block 612, the method 600 further includes (e.g., in an instance in which at least one feature engagement parameter satisfies a feature engagement threshold) identifying preload and/or non-preload interface elements and/or determining a feature interface element set preloading order. For example, the feature processing server 210 may include means, such as the processor 202, communications circuitry 204, feature processing circuitry 205, or the like, for identifying preload feature interface elements and non-preload feature interface elements and/or determining a feature interface element set preloading order. For example, the feature processing server 210 may identify (e.g., flag, tag, and/or designate) certain feature interface elements from a feature interface element set that is associated with a particular user as preload feature interface elements (e.g., based on each satisfying feature engagement threshold(s), including but not limited to feature interface element size, loading latency period, interaction count, frequency of interactions within predefined time period, and/or the like). Similarly, the feature processing server 210 may identify (e.g., flag, tag, and/or designate) certain feature interface elements from a feature interface element set that is associated with a particular user as non-preload feature interface elements (e.g., based on each failing to satisfy feature engagement threshold(s)). In some embodiments, the feature processing server 210 determines a feature interface element set preloading order with respect to a feature interface element set that is associated with a user defining an optimal order for preloading the feature interface element set as part of a card-based collaborative workflow management user interface. In some embodiments, the above-noted determinations of the feature processing server 210 may be outputs of the feature engagement prediction machine learning model.

At Block 614, the method 600 further includes (e.g., subsequent to identifying preload feature interface elements, non-preload interface elements, and/or determining a feature interface element set preloading order) generating a feature preload data object. For example, the feature processing server 210 may include means, such as the processor 202, communications circuitry 204, feature processing circuitry 205, or the like, for generating a feature preload data object. In some embodiments, the feature preload data object refers to structured data and/or computer executable instructions that is used to generate feature interface elements as part of a card-based collaborative workflow management user interface. The feature preload data object can be used to facilitate preloading to a client device cache for customized low latency rendering of at least one feature interface element. As noted herein, the exemplary feature preload data object can describe or define preload feature interface elements, non-preload interface elements, a feature interface element set preloading order, in addition to direct (e.g., nested feature interface elements) and/or indirect (e.g., inferred) relationships and interdependencies between feature interface elements. Accordingly, the feature preload data object can stored/retrieved in a client device cache and utilized to facilitate customized low latency rendering of at least one feature interface element (e.g., in response to a card-based collaborative workflow management user interface session launch indication, or other detected user interaction).

At Block 616, the method 600 further includes outputting the feature preload data object to a card-based collaborative workflow management user interface (e.g., of an apparatus such as client device 101A). In this regard, the feature processing server 210 may include means, such as processor 202, input/output circuitry 203, communications circuitry

204, feature processing circuitry 205, or the like, for outputting the feature preload data object to be utilized for feature preload data object processing operations.

FIG. 6B is a signal diagram of an example data flow represented by method 600. That is, FIG. 6B illustrates an example signal diagram illustrating data flow interactions between a feature processing server, one or more repositories, and a client device when managing a card-based collaborative workflow management user interface in accordance with some embodiments. Method 600 is described as being performed by a client device 101A, a feature processing server 210, feature data repository 215, and/or user data repository 225. These may be similar to those discussed above with regards to FIG. 1.

Returning to FIG. 5, the method 500 continues to Block 504, and the client device 101A retrieves a feature preload data object. For example, the client device 101A may include means (such as a processor, input/output circuitry, communications circuitry, processing circuitry, or the like) for retrieving the feature preload data object. In some embodiments, the feature preload data object is stored locally by the client device 101A (e.g., in a client device cache) and used to generate customized low latency rendering of feature interface elements in response to in response to a card-based collaborative workflow management user interface session launch indications or user interactions with the card based collaborative workflow management user interface.

At Block 506, the method 500 further includes preloading at least one feature interface element using the feature preload data object (e.g., during a feature preload data object validity period). For example, the client device 101A may include means (such as a processor, input/output circuitry, communications circuitry, processing circuitry, or the like) for preloading at least one feature interface element in conjunction with a card based collaborative workflow management user interface 300, such as feature interface elements 301, 302, 310A and 310B depicted in FIG. 3A. In various embodiments, an end-user may interact with or engage with a particular feature interface element. Referring now to FIG. 3A and FIG. 3B, user interaction or engagement (e.g., a click, hover, selection, or the like) with feature interface element 302 ("Filter" user-selectable interface element) may trigger rendering of an associated feature interface element 310C (providing/supporting a search bar feature/filtering functionality).

At Block 508, the method 500 optionally further includes preloading at least one secondary feature interface element in response to user interaction via the card-based collaborative workflow management user interface. For example, the client device 101A may include means (such as a processor, input/output circuitry, communications circuitry, processing circuitry, or the like) for preloading the at least one secondary feature interface element. Referring now to FIG. 3B and FIG. 3C, user engagement with at least one of feature interface element 301, 310A, 310B and 310D, may trigger preloading of the secondary feature interface element 310D which may be related thereto. In some embodiments, the feature processing server 210 determines that based on a degree of interaction with a first feature interface element, a user is likely to request or interact with a second feature interface element. In some embodiments, the client device 101A may monitor user interactions with feature interface elements during sessions in order to determine whether or not to preload a secondary feature interface element that may be associated therewith (based at least in part on the feature preload data object instructions).

Referring now to FIG. 3D and FIG. 3E, additional schematic diagrams depicting exemplary card based collaborative workflow management user interfaces 304 in accordance with various embodiments of the present disclosure are provided. As depicted, each feature interface element (e.g., feature interface elements 315B in FIG. 3D) comprises one or more renderings of feature interface sub-elements (e.g., feature interface sub-elements 307B comprising card data object(s), board data object(s), and/or list data object(s)) to enable collaboration among users as depicted in FIG. 3D. In various examples, an end user may interact with or engage with one or more feature interface elements 315A, 315B, 315C, 315D, and 315E. The "Workspaces" feature interface element 303 may be a preload feature interface element where user engagement/selection of one or more of the feature interface elements (e.g., feature interface elements 315A, 315B, 315C, 315D, and/or 315E), page load/refresh, or card-based collaborative workflow management user interface session launch indication triggers preloading of the "Workspaces" feature interface element. In some embodiments, one or more feature engagement parameters such as a feature interface element size, loading latency period and/or feature interface element interaction count associated with the "Workspaces" feature interface element 303 (and related feature interface sub-elements) may be determined to satisfy a plurality of corresponding feature engagement thresholds. By way of example, a loading latency period threshold may be 4 seconds and a feature interface element size threshold may be 1 KB. The "Workspaces" feature interface element 303 may have an above-threshold loading latency period of 6 seconds and an above-threshold feature interface element size of 2 KB. In this example, a card-based collaborative workflow management user interface session launch indication or a user interaction with one or more direct/indirectly related feature interface elements subsequent to the session launch (as defined by a feature preload data object) may trigger preloading of the "Workspaces" feature interface element 303.

Referring now to FIG. 3E, in response to user selection of the "Workspaces" feature interface element 303 at a subsequent time during the session, a menu comprising a plurality of Workspaces-related feature interface elements 315F is rendered within the card based collaborative workflow management user interfaces 304. In the example above, because the "Workspaces" feature interface element 303 and a plurality of related feature interface elements have been preloaded, in response to the user selection of the "Workspaces" feature interface element 303, the noted menu will render perceptively faster (e.g., within 200 ms instead of 6 seconds). Accordingly, efficient management the card-based collaborative workflow management user interface session can be provided without transmitting multiple requests/API calls to the feature processing server 210 during an active session.

Referring now to FIG. 4, an exemplary data structure depicting data/information that may be associated with an example card-based collaborative workflow management user interface and/or corresponding feature preload data object is provided. As depicted in FIG. 4, the table describes a preload status 403, feature interface element size 405, and loading latency period 407 for each of a plurality of feature interface elements 401 that are depicted in FIG. 3C. As illustrated, the feature interface elements 301A, 301, 310B, 310D, 302, and 310C are each associated with a feature interface element size 405 and loading latency period 407. Additionally, as depicted, feature interface elements 310A, 301, 310B and 310D are preload feature interface elements that are each associated with a relatively high loading latency period (e.g., 1 second or above). As further depicted, feature interface elements 302 and 310C are non-preload feature interface elements that each have a relatively low loading latency period (e.g., below 1 second). Additionally, as further illustrated in FIG. 4, the exemplary data structure defines a feature interface element set preloading order (i.e., 310A, 301, 310B, 310D, 302, and 310C). Thus, the feature interface elements may be rendered within a card-based collaborative workflow management user interface in accordance with the feature interface element set preloading order. During periods of high traffic and demand, various parameters may be modified to further improve feature preload data object processing operations. For example, during a high traffic period, the feature interface element size and/or loading latency period thresholds may be temporarily increased. In some embodiments, a feature interface element set preloading order may further define one or more groupings of feature interface elements that can be preloaded together (e.g., as a chunk or subset). For example, during high demand periods, feature interface elements 310A and 301 may be preloaded as a first subset, and then feature interface elements 310B and 301D may be preloaded as a second subset. In contrast, during a low traffic period, all preload feature interface elements 310A, 301, 310B and 310D can be preloaded simultaneously.

In some embodiments, the feature preload data object includes or defines a feature preload data object validity period defining a time period during which the feature preload data object can be utilized (e.g., by the client device 101A) to perform preloading operations. For example, a feature preload data object validity period can be 2 days or 7 days. Accordingly, a card-based collaborative workflow management user interface can use the feature preload data object during the relevant time period until the feature preload data object validity period expires. Subsequent to expiration of a feature preload data object validity period, an example feature preload data object can be automatically deleted or removed from a client device cache. In some embodiments, expiration of the feature preload data object validity period triggers an automatic request generated by the client device 101A to the feature processing server 210 for a new/updated feature preload data object to be generated and transmitted by the feature processing server 210.

Although various implementations of the present disclosure are described in the context of a card-based collaborative workflow management system, the present disclosure is not limited to such examples. The methods, apparatus, systems, computing devices, and/or the like described herein may be used to intelligently manage any type of data (e.g., user interface data) for any purpose and may be used in connection with numerous exemplary system architectures as detailed herein. One of ordinary skill in the art will appreciate that the feature emphasis element, feature processing server, and related concepts discussed herein may be applied to manage user interfaces associated with a variety of systems. For example, the noted methods, apparatuses, systems, and techniques may be used to manage user interfaces for systems including, but not limited to, other workflow management systems, browser-based workflow management systems, document management systems, content generation/management systems, enterprise content management systems, record management systems, imaging management systems, social media content management systems, and/or the like. By way of example, an enterprise content management system may comprise an apparatus (e.g., feature processing server) that is configured to generate feature preload data objects using the techniques described herein and output the feature preload data object to a client device associated with the user identifier to enable low latency rendering of one or more feature interface elements to an enterprise content management system user interface.

FIGS. 5, 6A and 6B, thus illustrate flowcharts and signal diagrams describing the operation of apparatuses, methods, systems, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 201 of the feature processing server 210 and executed by a processor 202 of the feature processing server 210. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Thus, particular embodiments of the subject matter have been described. While this specification contains many specific implementation details, these should not be construed as limitations on the scope of any inventions or of what may be claimed, but rather as description of features specific to particular embodiments of particular inventions. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus configured to manage a card-based collaborative workflow management user interface associated with a card-based collaborative workflow management system, the apparatus comprising at least one processor and at least one non-transitory memory, the at least one non-transitory memory having computer-coded instructions therein, wherein the computer-coded instructions are configured to, in execution with the at least one processor, cause the apparatus to:

identify a user identifier associated with a card-based collaborative workflow management user interface session launch indication;

retrieve user data associated with the user identifier from a user data repository;

retrieve, based at least in part on at least one feature identifier associated with the user data, feature data from a feature data repository, wherein the at least one feature identifier is associated with one or more feature interface elements that enable at least one function of the card-based collaborative workflow management system;

determine, based at least in part on analysis of the user data and the feature data, whether at least one feature engagement parameter associated with the at least one feature identifier satisfies at least one feature engagement threshold;

in an instance in which the at least one feature engagement parameter satisfies the at least one feature engagement threshold, generate a feature preload data object corresponding to a set of feature interface elements, wherein the feature preload data object defines a first subset of the set of feature interface elements as one or more preload feature interface elements and a second subset of the set of feature interface elements as one or more non-preload interface elements; and output the feature preload data object to a client device associated with the user identifier to enable low latency rendering of the one or more preload feature interface elements to the card-based collaborative workflow management user interface.

2. The apparatus of claim 1, wherein the feature preload data object comprises computer-executable instructions for preloading at least one of a plurality of feature interface elements in the card-based collaborative workflow management user interface.

3. The apparatus of claim 2, wherein each of the plurality of feature interface elements is associated with a feature preload data object validity period.

4. The apparatus of claim 1, wherein determining whether the at least one feature engagement parameter satisfies the at least one feature engagement threshold is determined using a feature engagement prediction machine learning model.

5. The apparatus of claim 3, wherein the feature engagement prediction machine learning model is trained based at least in part on historical feature data associated with the at least one feature identifier and user activity data logs.

6. The apparatus of claim 1, wherein the user data comprises historical user interaction data with the card-based collaborative workflow management user interface.

7. The apparatus of claim 1, wherein the at least one feature engagement threshold comprises a configurable parameter defining at least one of a user interaction time period, an interaction count, a feature interface element size, and a loading latency period associated with at least one feature interface element.

8. The apparatus of claim 1, wherein the computer-coded instructions are configured to, in execution with the at least one processor, cause the apparatus to:

determine, based at least on the user data and the feature data, feature interface element set preloading order; and generate the feature preload data object based at least in part on the feature interface element set preloading order.

9. The apparatus of claim 8, wherein the feature preload data object is configured to:

trigger preloading of the plurality of feature interface elements in accordance with the feature interface element set preloading order.

10. The apparatus of claim 9, wherein the feature preload data object is configured to:

trigger preloading of at least one secondary feature interface element in response to a user interaction with at least one of the plurality of feature interface elements.

11. A computer-implemented method for managing a card-based collaborative workflow management user interface associated with a card-based collaborative workflow management system, the computer-implemented method comprising:

identifying, by one or more processors, a user identifier associated with a card-based collaborative workflow management user interface session launch indication;

retrieving, by the one or more processors, user data associated with the user identifier from a user data repository;

retrieving, by the one or more processors and based at least in part on at least one feature identifier associated with the user data, feature data from a feature data repository, wherein the at least one feature identifier is associated with one or more feature interface elements that enable at least one function of the card-based collaborative workflow management system;

determining, by the one or more processors and based at least in part on analysis of the user data and the feature data, whether at least one feature engagement parameter associated with the at least one feature identifier satisfies at least one feature engagement threshold;

in an instance in which the at least one feature engagement parameter satisfies the at least one feature engagement threshold, generating, by the one or more processors, a feature preload data object corresponding to a set of feature interface elements, wherein the feature preload data object defines a first subset of the set of feature interface elements as one or more preload feature interface elements and a second subset of the set of feature interface elements as one or more non-preload interface elements; and outputting, by the one or more processors, the feature preload data object to a client device associated with the user identifier to enable low latency rendering of the one or more preload feature interface elements to the card-based collaborative workflow management user interface.

12. The computer-implemented method of claim 11, wherein the feature preload data object comprises computer-executable instructions for preloading at least one of a plurality of feature interface elements in the card-based collaborative workflow management user interface.

13. The computer-implemented method of claim 12, wherein each of the plurality of feature interface elements is associated with a feature preload data object validity period.

14. The computer-implemented method of claim 11, wherein determining whether the at least one feature engagement parameter satisfies the at least one feature engagement threshold is determined using a feature engagement prediction machine learning model.

15. The computer-implemented method of claim 13, wherein the feature engagement prediction machine learning model is trained based at least in part on historical feature data associated with the at least one feature identifier and user activity data logs.

16. The computer-implemented method of claim 11, wherein the user data comprises historical user interaction data with the card-based collaborative workflow management user interface.

17. The computer-implemented method of claim 11, wherein the at least one feature engagement threshold comprises a configurable parameter defining at least one of a user interaction time period, an interaction count, a feature interface element size, and a loading latency period associated with at least one feature interface element.

18. The computer-implemented method of claim 11, further comprising:

determining, by the one or more processors and based at least on the user data and the feature data, feature interface element set preloading order; and generating, by the one or more processors, the feature preload data object based at least in part on the feature interface element set preloading order.

19. The computer-implemented method of claim 18, wherein the feature preload data object is configured to:

trigger preloading of the plurality of feature interface elements in accordance with the feature interface element set preloading order.

20. The computer-implemented method of claim 19, wherein the feature preload data object is configured to:

trigger preloading of at least one secondary feature interface element in response to a user interaction with at least one of the plurality of feature interface elements.

21. A computer program product comprising at least one non-transitory computer-readable storage medium having computer-readable program code portions stored therein, the computer-readable program code portions comprising an executable portion configured to:

identify a user identifier associated with a card-based collaborative workflow management user interface session launch indication;

retrieve user data associated with the user identifier from a user data repository;

retrieve, based at least in part on at least one feature identifier associated with the user data, feature data from a feature data repository, wherein the at least one feature identifier is associated with one or more feature interface elements that enable at least one function of the card-based collaborative workflow management system;

determine, based at least in part on analysis of the user data and the feature data, whether at least one feature engagement parameter associated with the at least one feature identifier satisfies at least one feature engagement threshold;

in an instance in which the at least one feature engagement parameter satisfies the at least one feature engagement threshold, generate a feature preload data object corresponding to a set of feature interface elements, wherein the feature preload data object defines a first subset of the set of feature interface elements as one or more preload feature interface elements and a second subset of the set of feature interface elements as one or more non-preload interface elements; and output the feature preload data object to a client device associated with the user identifier to enable low latency rendering of the one or more preload feature interface elements to the card-based collaborative workflow management user interface.

22. The computer program product of claim 21, wherein the feature preload data object comprises computer-executable instructions for preloading at least one of a plurality of feature interface elements in the card-based collaborative workflow management user interface.

23. The computer program product of claim 22, wherein each of the plurality of feature interface elements is associated with a feature preload data object validity period.

24. The computer program product of claim 21, wherein determining whether the at least one feature engagement parameter satisfies the at least one feature engagement threshold is determined using a feature engagement prediction machine learning model.

25. The computer program product of claim 23, wherein the feature engagement prediction machine learning model is trained based at least in part on historical feature data associated with the at least one feature identifier and user activity data logs.

26. The computer program product of claim 21, wherein the user data comprises historical user interaction data with the card-based collaborative workflow management user interface.

27. The computer program product of claim 21, wherein the at least one feature engagement threshold comprises a configurable parameter defining at least one of a user interaction time period, an interaction count, a feature interface element size, and a loading latency period associated with at least one feature interface element.

28. The computer program product of claim 21, wherein the computer-readable program code portions comprise the executable portion configured to:

determine, based at least on the user data and the feature data, feature interface element set preloading order; and generate the feature preload data object based at least in part on the feature interface element set preloading order.

29. The computer program product of claim 28, wherein the feature preload data object is configured to:

trigger preloading of the plurality of feature interface elements in accordance with the feature interface element set preloading order.

30. The computer program product of claim 29, wherein the feature preload data object is configured to:

trigger preloading of at least one secondary feature interface element in response to a user interaction with at least one of the plurality of feature interface elements.

31. An apparatus configured to manage an enterprise content management system user interface associated with an enterprise content management system, the apparatus comprising at least one processor and at least one non-transitory memory, the at least one non-transitory memory having computer-coded instructions therein, wherein the computer-coded instructions are configured to, in execution with the at least one processor, cause the apparatus to:

identify a user identifier associated with an enterprise content management system management user interface session launch indication;

retrieve user data associated with the user identifier from a user data repository;

retrieve, based at least in part on at least one feature identifier associated with the user data, feature data from a feature data repository, wherein the at least one feature identifier is associated with one or more feature interface elements that enable at least one function of the card-based collaborative workflow management system;

determine, based at least in part on analysis of the user data and the feature data, whether at least one feature engagement parameter associated with the at least one feature identifier satisfies at least one feature engagement threshold;

in an instance in which the at least one feature engagement parameter satisfies the at least one feature engagement threshold, generate a feature preload data object corresponding to a set of feature interface elements, wherein the feature preload data object defines a first subset of the set of feature interface elements as one or more preload feature interface elements and a second subset of the set of feature interface elements as one or more non-preload interface elements; and output the feature preload data object to a client device associated with the user identifier to enable low latency rendering of the one or more preload feature interface elements to the enterprise content management system user interface.

* * * * *